(12) United States Patent
Youngkin

(10) Patent No.: US 9,304,263 B2
(45) Date of Patent: Apr. 5, 2016

(54) FIBER OPTIC CONNECTOR ASSEMBLY

(71) Applicant: Positronic Industries, Inc., Springfield, MO (US)

(72) Inventor: Scott Youngkin, Springfield, MO (US)

(73) Assignee: Positronic Industries, Inc., Springfield, MO (US)

( * ) Notice: Subject to any disclaimer, the term of this patent is extended or adjusted under 35 U.S.C. 154(b) by 0 days.

(21) Appl. No.: 14/489,197

(22) Filed: Sep. 17, 2014

(65) Prior Publication Data
US 2015/0003786 A1  Jan. 1, 2015

Related U.S. Application Data

(62) Division of application No. 13/630,228, filed on Sep. 28, 2012, now Pat. No. 8,944,697.

(51) Int. Cl.
*G02B 6/38* (2006.01)
(52) U.S. Cl.
CPC .......... *G02B 6/3874* (2013.01); *G02B 6/3869* (2013.01); *G02B 6/3825* (2013.01); *G02B 6/3891* (2013.01); *G02B 6/3894* (2013.01)

(58) Field of Classification Search
CPC ... G02B 6/3869; G02B 6/3874; G02B 6/3891
USPC .......................................... 385/59, 71, 75, 77
See application file for complete search history.

(56) References Cited

U.S. PATENT DOCUMENTS

| | | | |
|---|---|---|---|
| 4,738,463 A | 4/1988 | Poore et al. | |
| 4,804,243 A | 2/1989 | Borsuk et al. | |
| 4,998,892 A * | 3/1991 | Shiley | 439/381 |
| 5,391,091 A | 2/1995 | Nations | |
| 5,509,821 A | 4/1996 | Small et al. | |
| 5,608,828 A | 3/1997 | Coutts et al. | |
| 5,778,121 A | 7/1998 | Hyzin | |
| 6,398,423 B1 * | 6/2002 | Novacoski et al. | 385/78 |
| 7,115,002 B1 | 10/2006 | Gentry | |
| 7,137,743 B2 | 11/2006 | Graham et al. | |
| 7,186,121 B1 | 3/2007 | Costello et al. | |
| 7,244,138 B2 | 7/2007 | Sasame | |
| 7,377,808 B2 | 5/2008 | Gentry | |
| 2010/0197168 A1 | 8/2010 | Deren et al. | |
| 2012/0015542 A1 | 1/2012 | Wu | |

(Continued)

FOREIGN PATENT DOCUMENTS

JP    2008307879 A    12/2005

OTHER PUBLICATIONS www.ittcannon.com; PHD Fiber Optic Terminus Adapter for Combo D-Sub Connectors; p. 58.

(Continued)

*Primary Examiner* — Ryan Lepisto
(74) *Attorney, Agent, or Firm* — Senniger Powers LLP

(57) ABSTRACT

A connector includes an insulating connector body having a contact hole formed in the connector body. A metal shell receives the connector body. An adapter in the contact hole supports a fiber optic terminus. A securing member is located on an exterior surface of the connector body and releasably attaches the adapter to the connector body such that the adapter and terminus can be conjointly and nondestructively inserted into the connector body and conjointly and nondestructively removed from the connector body.

14 Claims, 32 Drawing Sheets

(56) References Cited

U.S. PATENT DOCUMENTS

2012/0111555 A1 5/2012 Leveau et al.
2012/0155807 A1 6/2012 Knapp

OTHER PUBLICATIONS www.ittcannon.com; PHD Fiber Optic Terminus (Size 16 & 22); pp. 38-44.

NXTcon [connecting light]; Precision Optical Interconnects for Harsh Environments; 6 pages.
Sabritec; High Speed Fiber Optics Single and Multimode; Arinc 801 Technology; 2007; 2 pages.
International Search Report regarding corresponding PCT/US2013/061836 dated Jan. 16, 2014, 5 pages.
Written Opinion of the International Searching Authority regarding corresponding PCT/US2013/061836 dated Jan. 16, 2014, 5 pages.

* cited by examiner

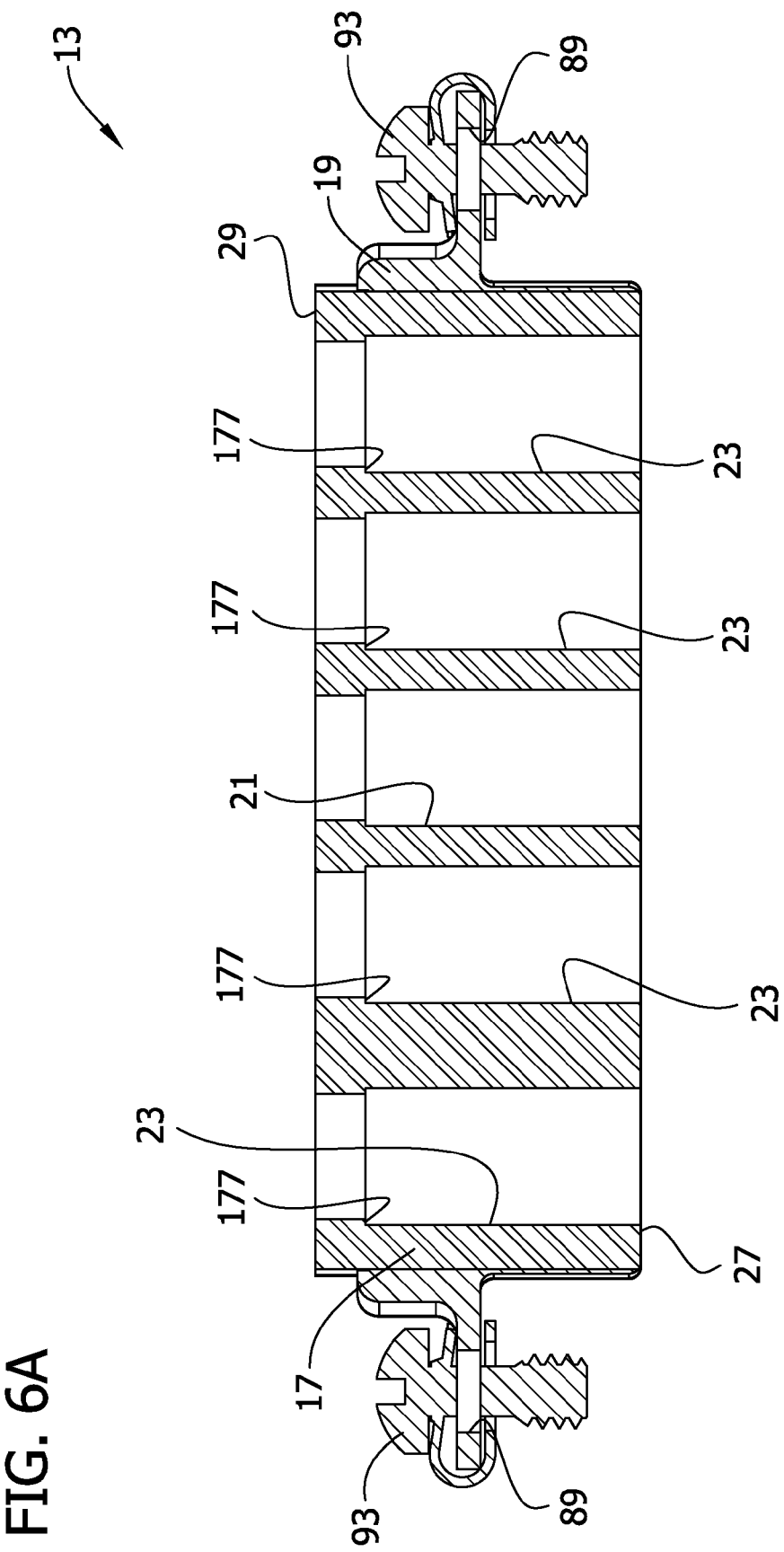

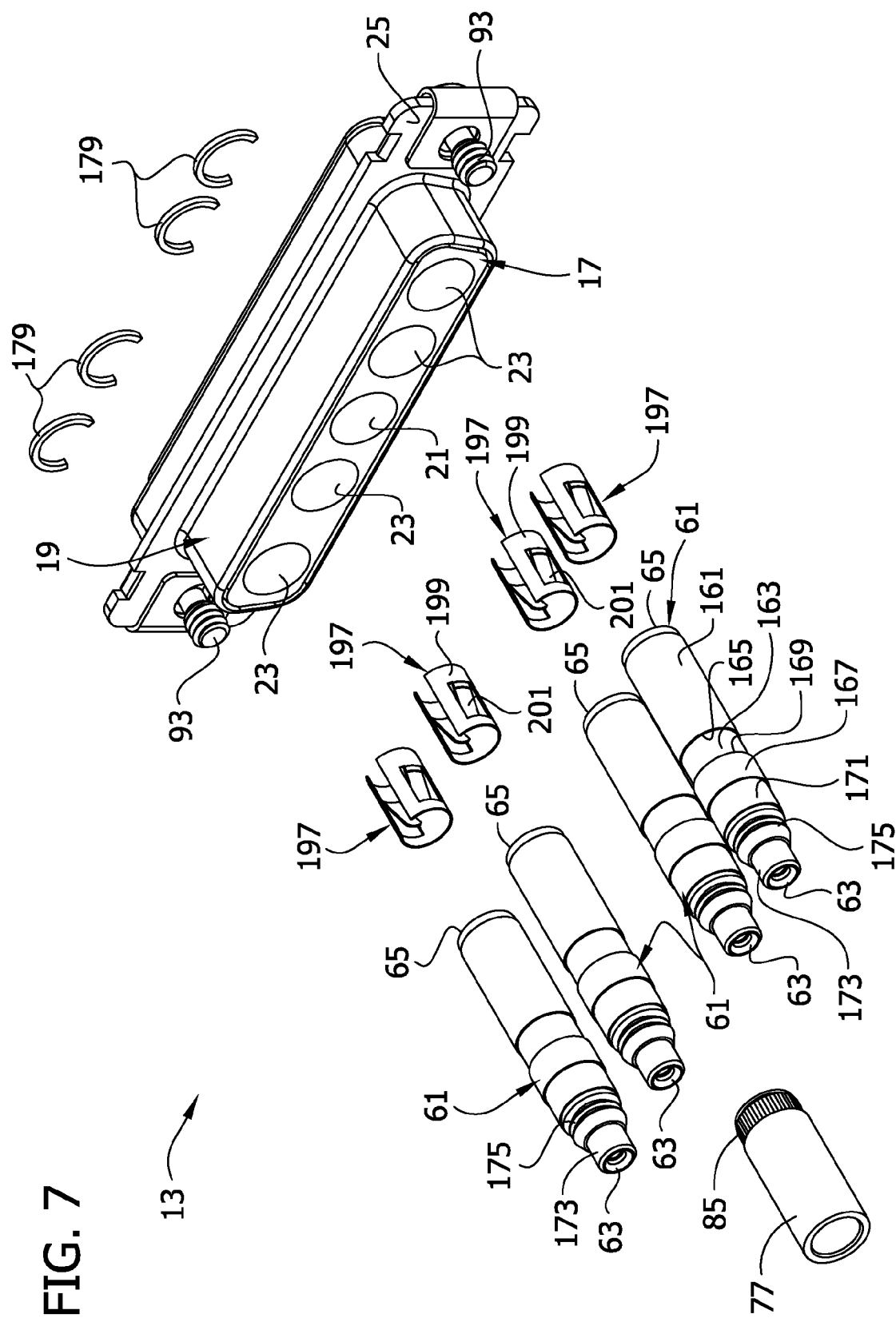

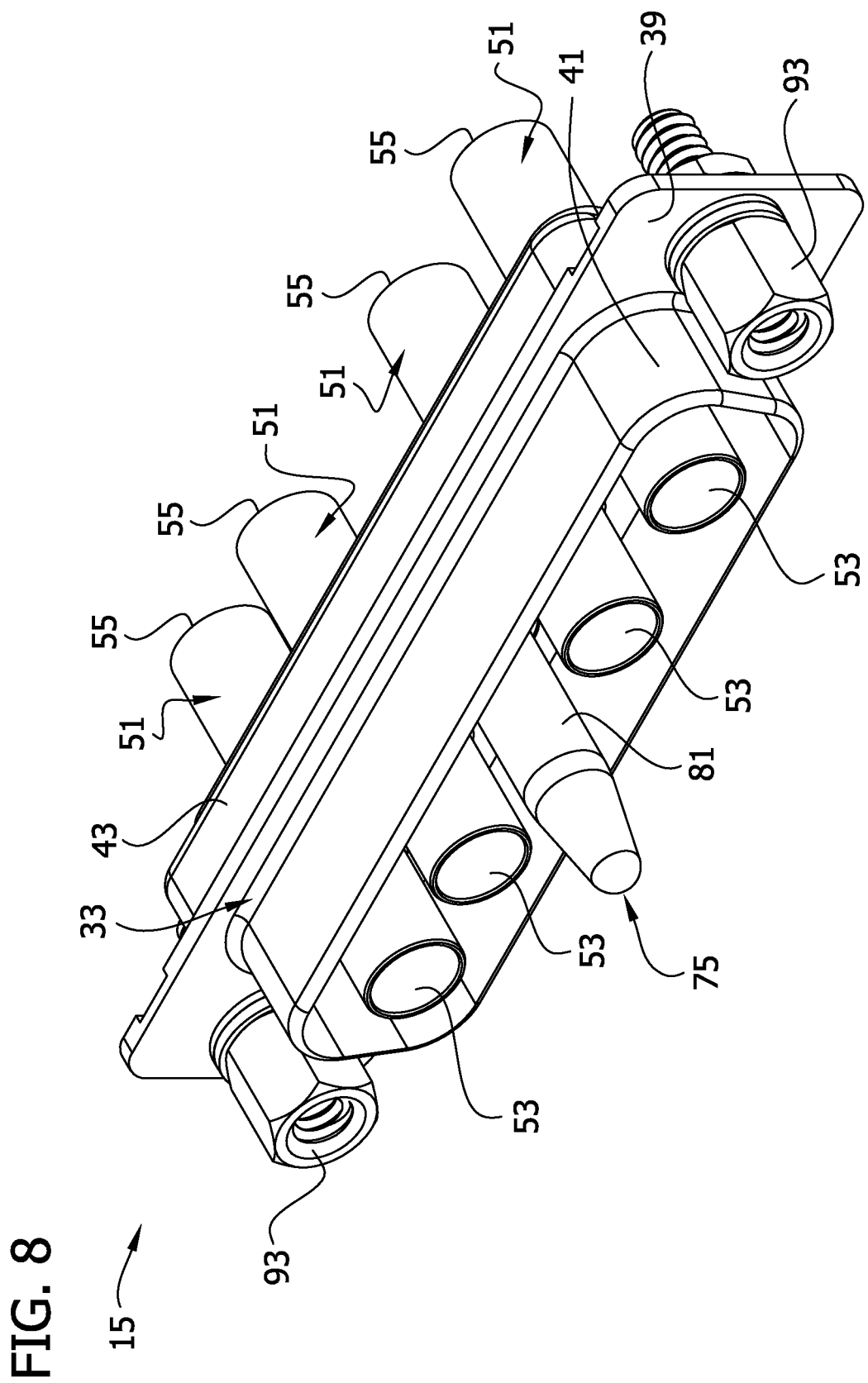

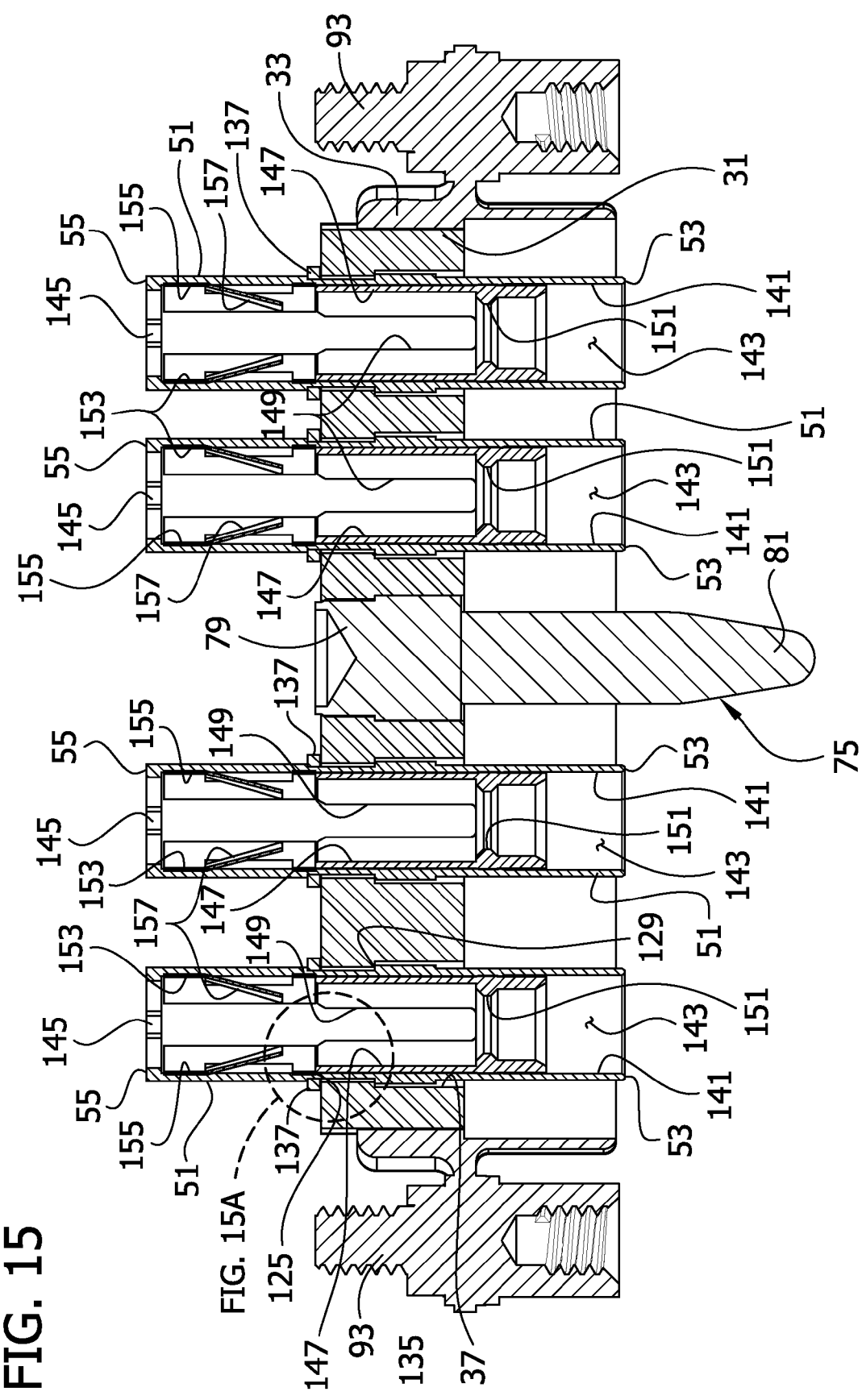

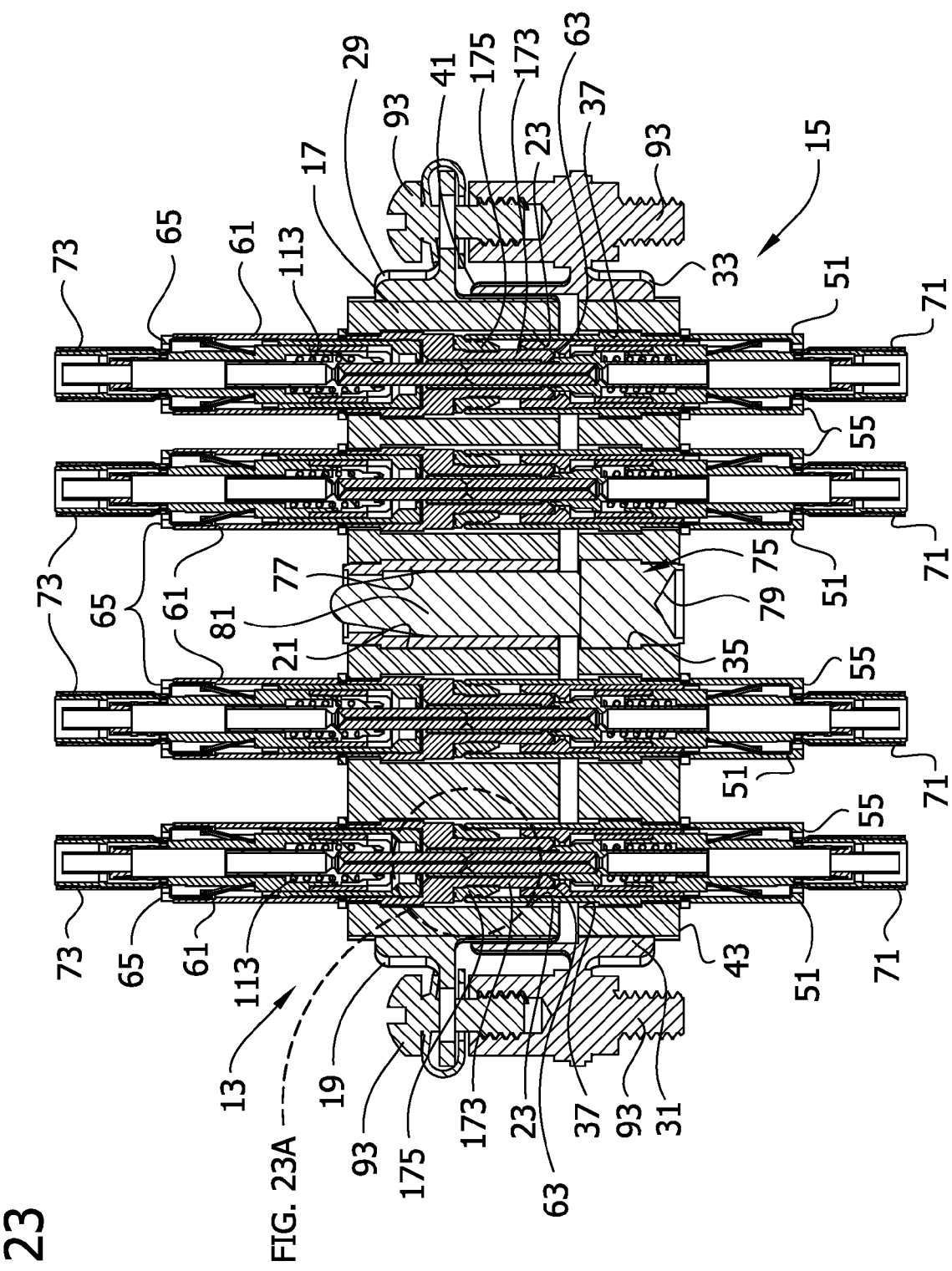

FIBER OPTIC CONNECTOR ASSEMBLY

CROSS-REFERENCE TO RELATED APPLICATION

This is a divisional application of U.S. Ser. No. 13/630,228, filed Sep. 28, 2012, now U.S. Pat. No. 8,944,697, the entirety of which is incorporated herein by reference.

FIELD OF THE INVENTION

The present invention generally relates to a fiber optic connector assembly and more particularly to a fiber optic connector assembly that protects the fiber optic contacts and/or provides for easy repair.

BACKGROUND

D-subminiature or D-sub connectors are a common type of electrical connector. D-sub connectors can be modified for use for fiber optic communication and network ports. Typically the connectors comprise a male connector having a male adapter that receives a fiber optic contact and a female connector having a female adapter that also receives a fiber optic contact. The adapters mount the fiber optic contacts in the respective connector. After the connectors are mated, a ceramic sleeve in the female connector surrounds ends of the fiber optic contacts. Modifying the connectors to receive fiber optic contacts requires high precision to ensure that the contacts are properly aligned. Otherwise, the fiber optic contacts can engage the ceramic sleeve and break the sleeve.

SUMMARY

In one aspect, a connector generally comprises an insulating connector body having a contact hole formed in the connector body. A metal shell receives the connector body. An adapter in the contact hole supports a fiber optic terminus. A securing member is located on an exterior surface of the connector body and releasably attaches the adapter to the connector body such that the adapter and terminus can be conjointly and nondestructively inserted into the connector body and conjointly and nondestructively removed from the connector body.

Other objects and features will be in part apparent and in part pointed out hereinafter.

BRIEF DESCRIPTION OF THE DRAWINGS

FIG. 6A is a section of the female D-sub connector of FIG. 6 with adapters removed for greater clarity;

FIG. 7 is an exploded perspective of the female D-Sub connector of FIG. 6;

FIG. 8 is a front perspective of a male D-Sub connector of the D-Sub connector assembly with fiber optic termini removed for greater clarity;

FIG. 15 is a section of the male D-Sub connector with fiber optic termini removed for greater clarity;

FIG. 23 is a section taken through line 23-23 in FIG. 22; and

Corresponding reference characters indicate corresponding parts throughout the drawings.

DETAILED DESCRIPTION

Figure 1:
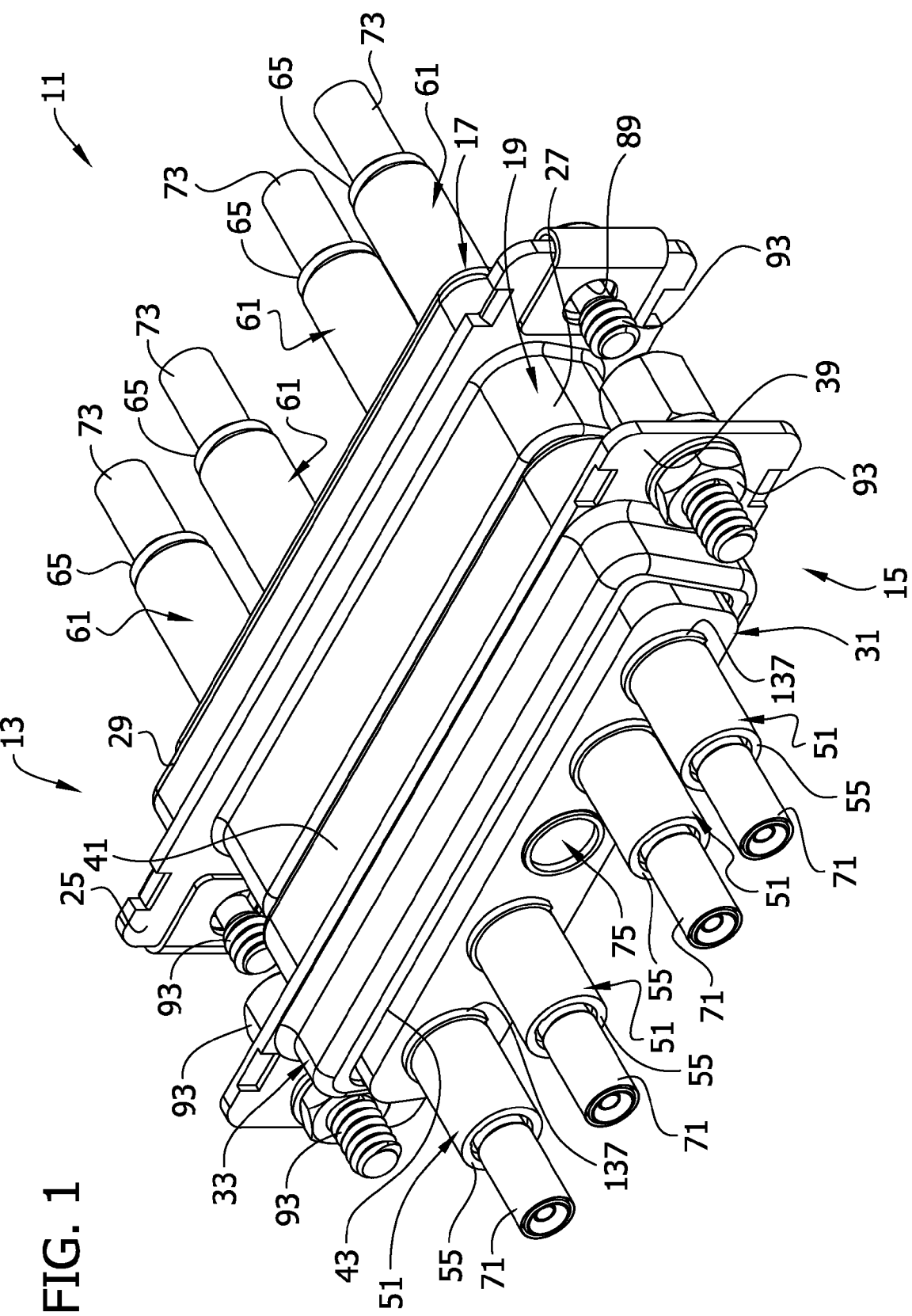
FIG. 1 is a perspective of a D-Sub connector assembly in a partially mated state.
Figure 2:
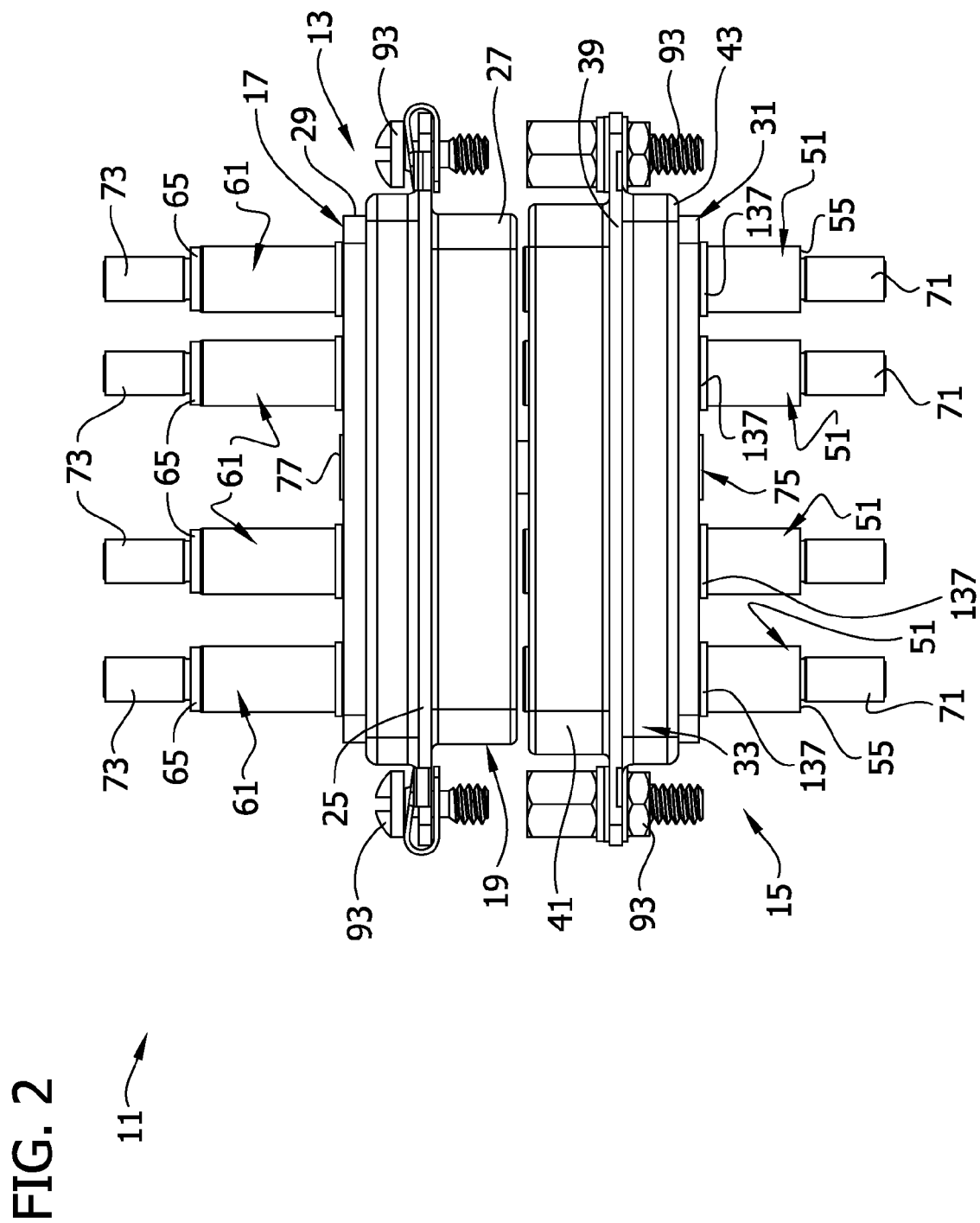
FIG. 2 is a top view of the D-Sub connector assembly of FIG. 1.
Figure 3:
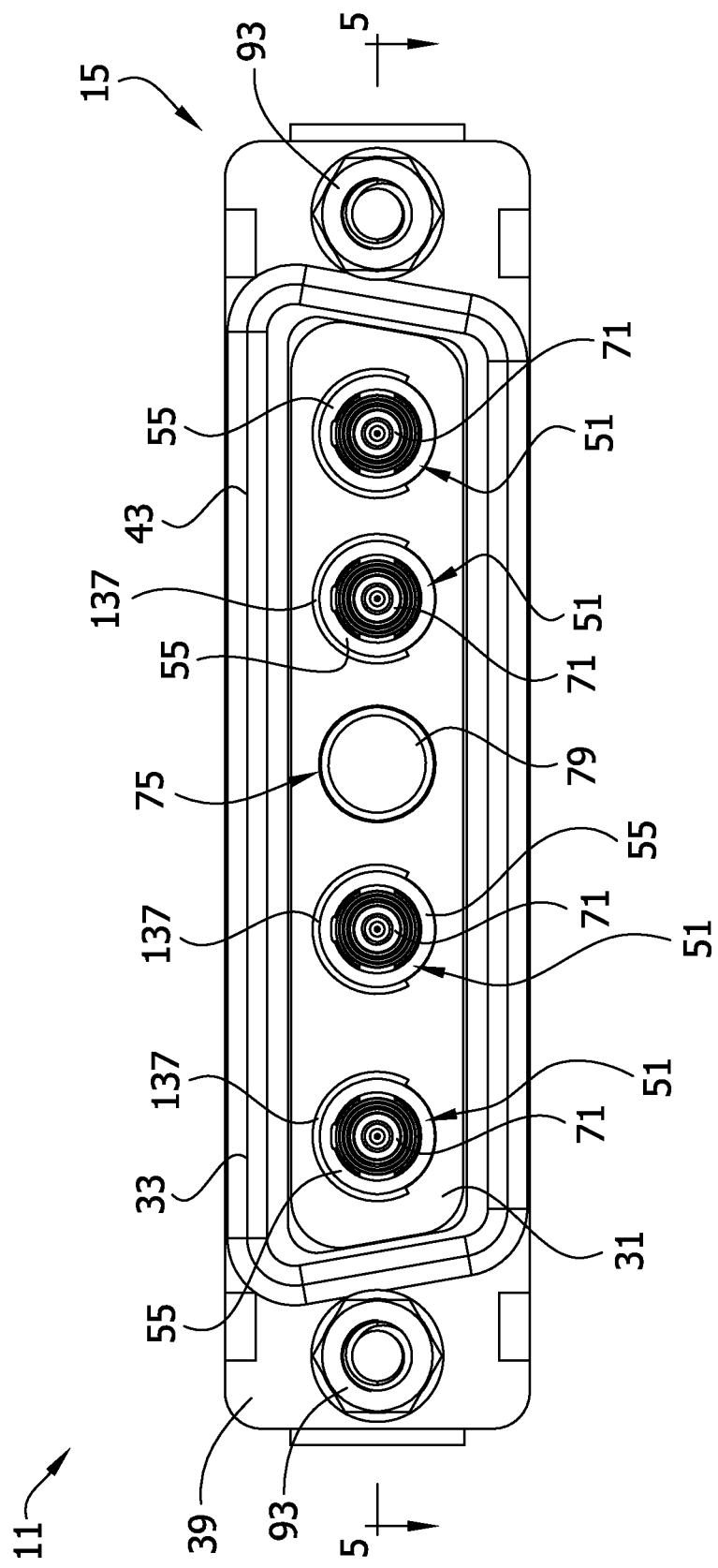
FIG. 3 is a front view of the D-Sub connector assembly.
Figure 4:
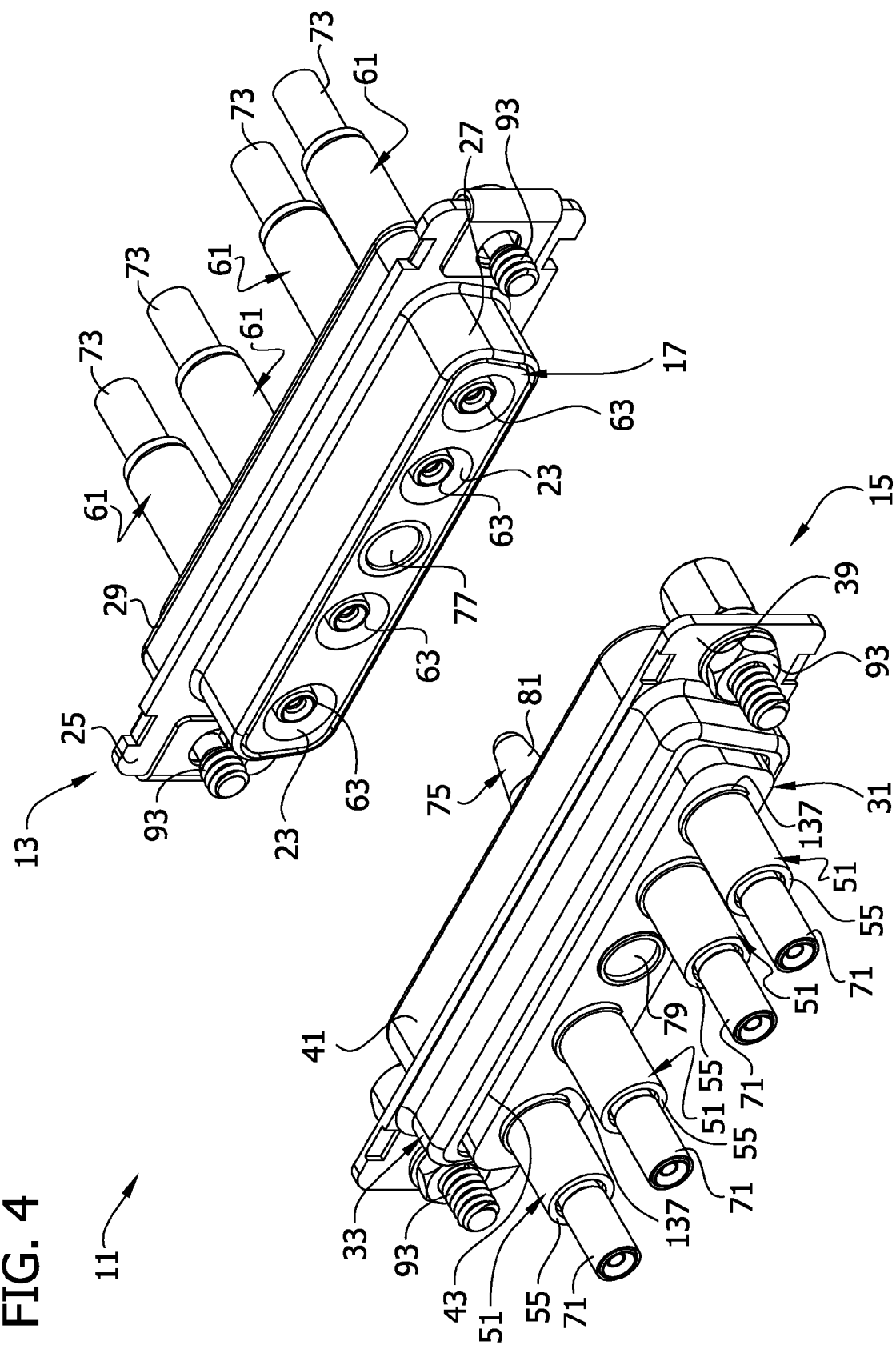
FIG. 4 is the D-Sub connector assembly in an unmated state.
Figure 5:
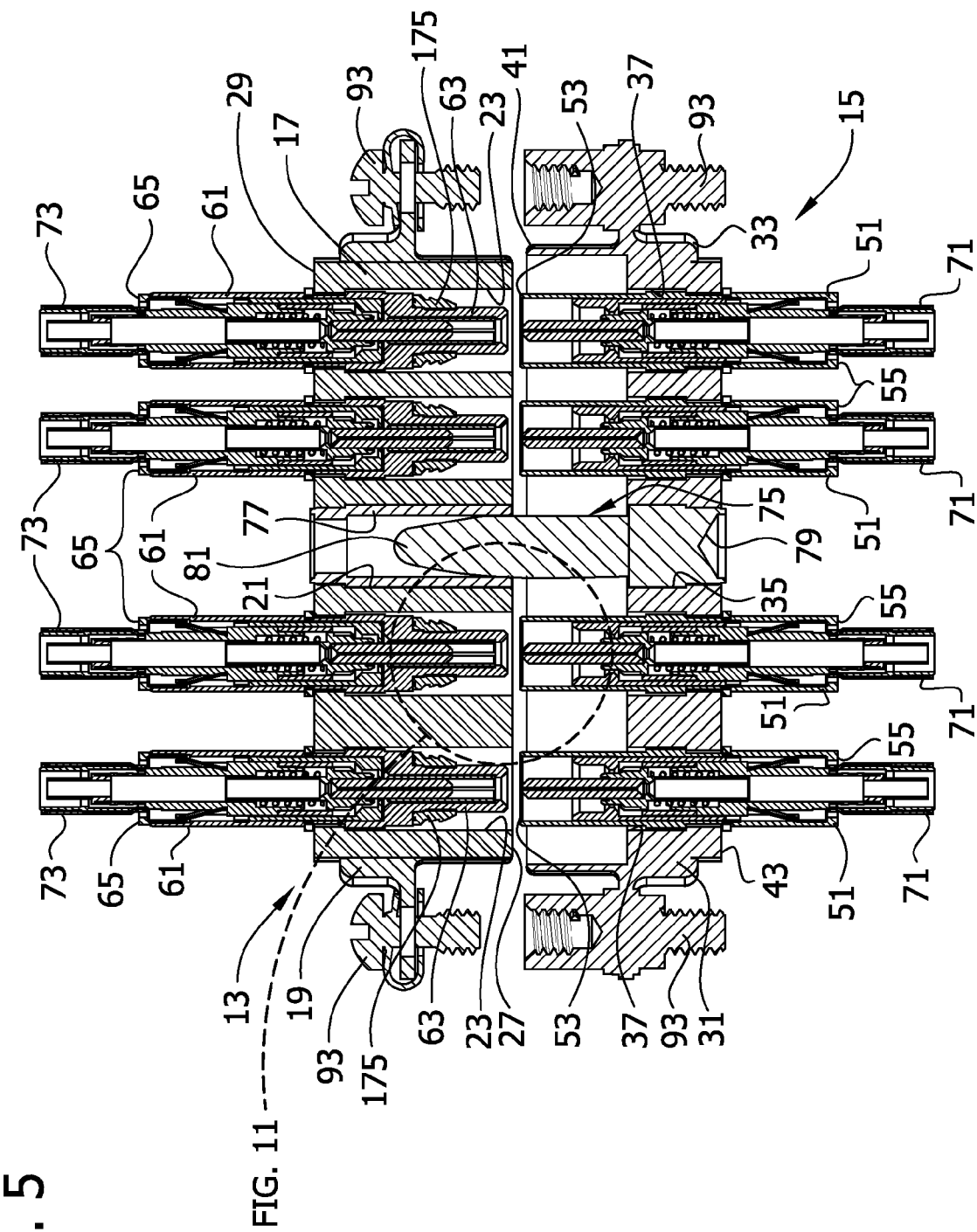
FIG. 5 is a section taken through line 5-5 in FIG. 3.
Figure 8A:
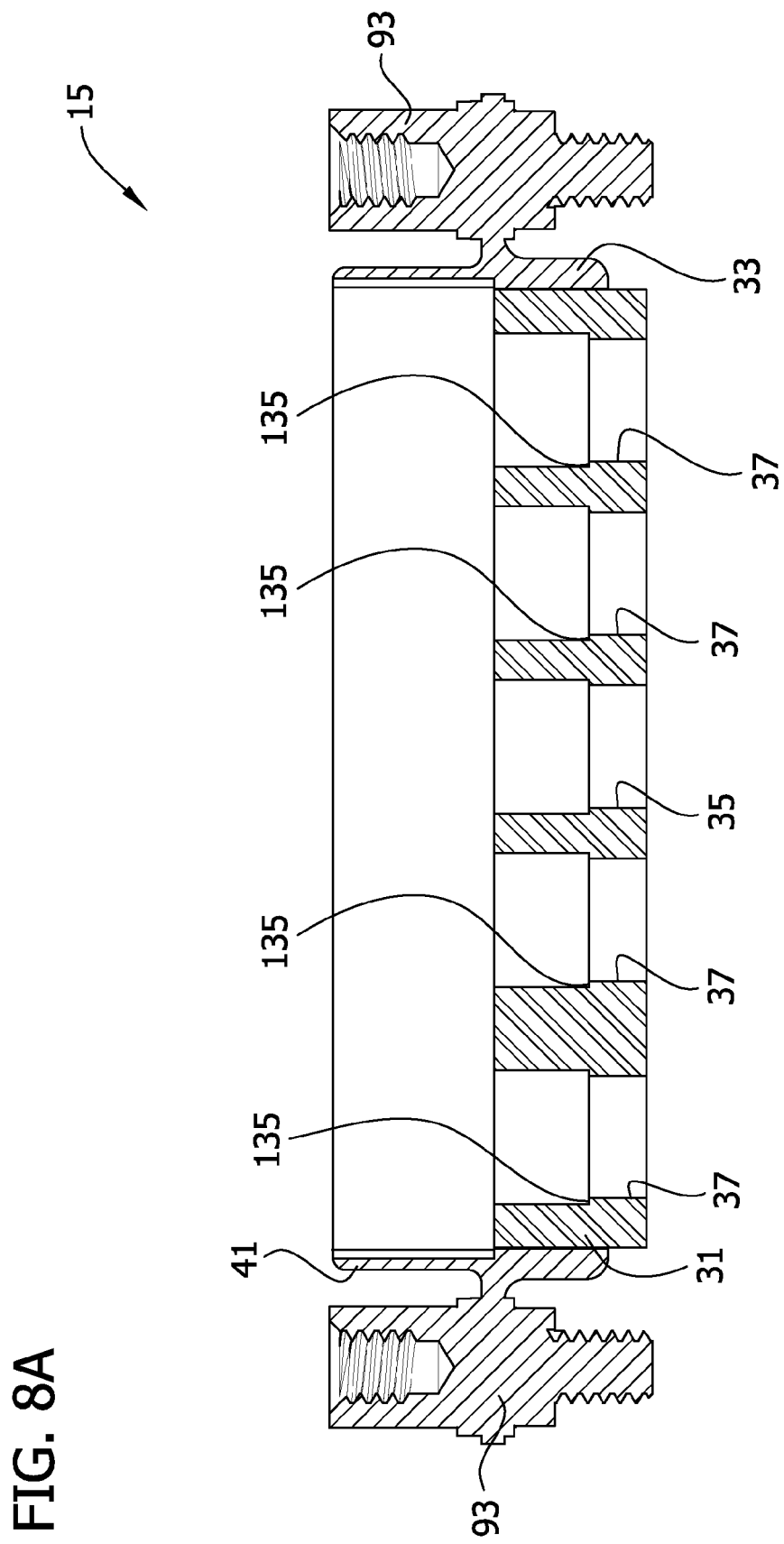
FIG. 8A is a section of the male D-sub connector of FIG. 8 with adapters removed for greater clarity.

Referring to the drawings a connector assembly is indicated generally at 11. The assembly comprises a female connector 13 configured for mating with a male connector 15. The female connector 13 includes an electrically insulating connector body 17 and a non-insulating shell 19 (e.g., metal shell) extending around the connector body. A guide hole 21 is formed in a center of the connector body 17 (FIGS. 5 and 6A). Contact holes 23 are formed in the connector body 17 on both sides of the guide hole 21. The shell 19 has a flange 25 that divides the female connector 13 into a connector portion 27 and an attachment portion 29. The male connector 15 is similarly constructed and includes an electrically insulating connector body 31 and a non-insulating (metal) shell 33 extending around the connector body. It will be understood that the materials can be other than described within the scope of the present invention. A guide hole 35 is formed in a center of the connector body 31 (FIG. 8A). Contact holes 37 are formed in the connector body 31 at opposing sides of the guide hole 35. The shell 33 has a flange 39 that divides the male connector 15 into a connector portion 41 and an attachment portion 43. The connector portion 41 extends forwardly from the flange 39. The connector portion 41 is sized and shaped to receive the connector portion 27 of the female connector 13 as will be explained in greater detail below. In the illustrated embodiment, the connectors 13, 15 are Combo-D-subminiature connectors. Thus, the connector portion 27 of the female connector 13 forms a slanted D-shaped projection that is slidably receivable in a slanted D-shaped receptacle formed by the connector portion 41 of the male connector 15.

Referring to FIGS. 5, 8, 9 and 9A, a set of first adapters 51 are disposed in the contact holes 37 of the connector body 33 of the male connector 15. An interface end 53 of the adapters 51 extends from the contact hole 37 of the connector body 31 into the connector portion 41 of the shell 33. An attachment end 55 extends out of the contact hole 37 in the connector body 31 in the opposite direction. Referring to FIGS. 5, 6, 7 and 7A, a second set of adapters 61 are disposed in the contact holes 23 in the connector body 17 of the female connector 13. An interface end 63 of each adapter 61 of the second set extends into the connector portion 27 of the shell 19, and an attachment end 65 of the adapter of the second set extends out of the contact hole 23 in the connector body 17 in the opposite direction. Each of the adapters 51 in the first set is configured for attaching a first fiber optic terminus 71 to the male connector 15 such that the first terminus is received in the contact hole 37 in the connector body 31 of the male connector. Each of the adapters 61 in the second set is configured for attaching a second terminus 73 to the female connector 13 such that the second terminus is received in the contact hole 23 in the female connector body 17.

Figure 9:
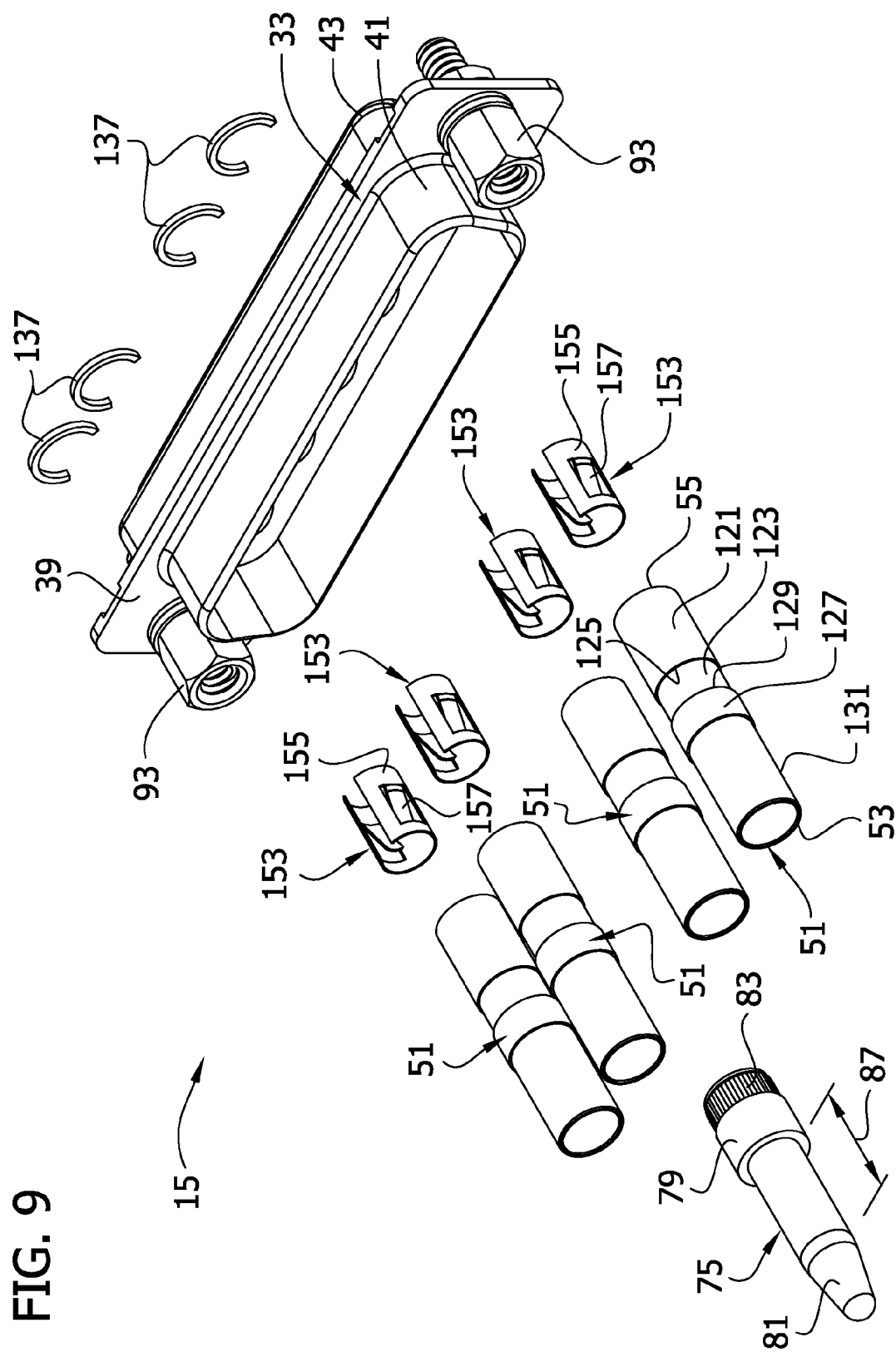
FIG. 9 is an exploded perspective of the male D-Sub connector.
Figure 10:
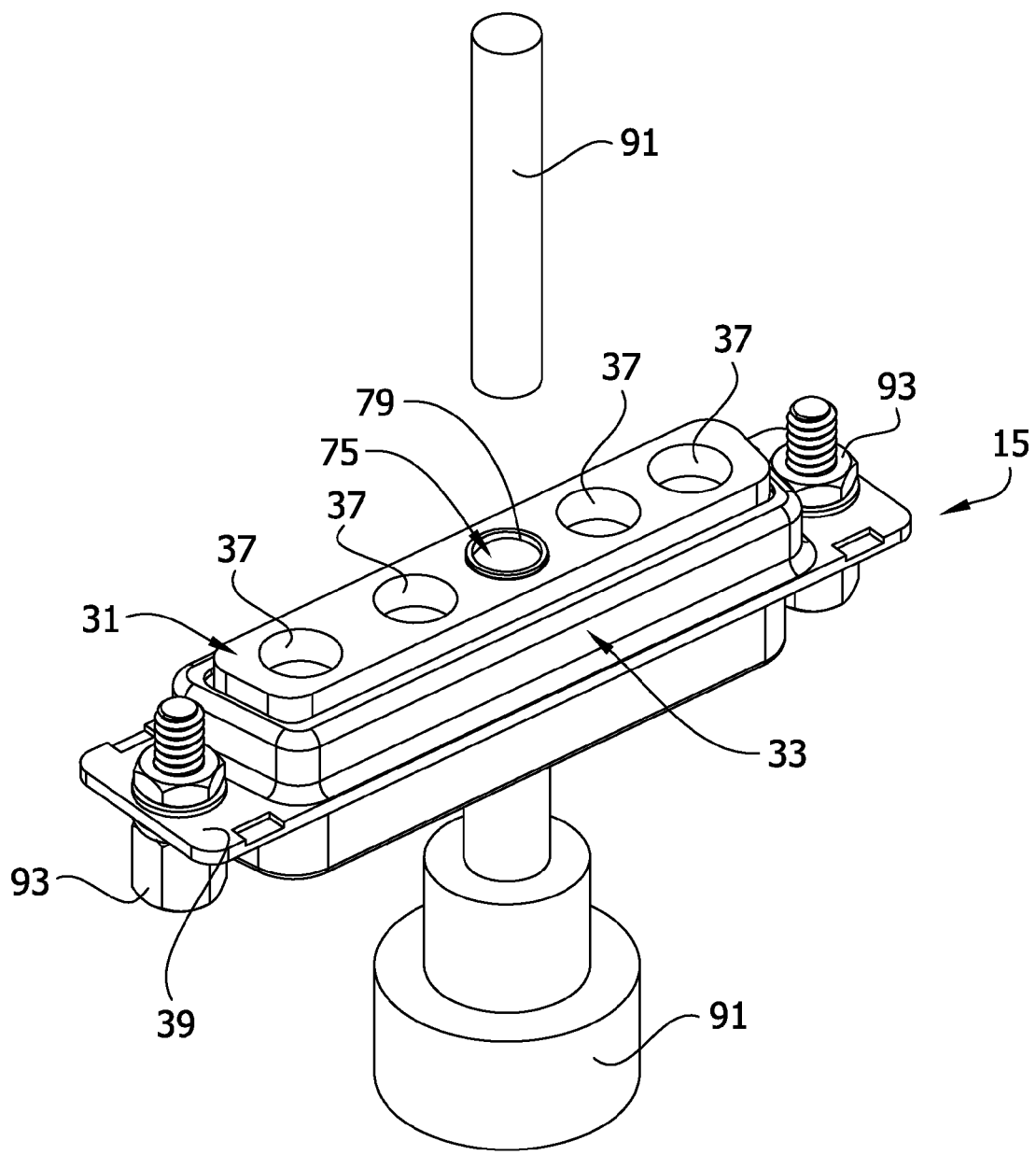
FIG. 10 is a perspective showing a swaging process.

Referring to FIGS. 5, 8 and 9, a guide pin 75 is disposed in the center guide hole 35 in the male connector 15 and a guide bushing 77 is disposed in the center guide hole 21 in the female connector 13. The guide pin 75 could be disposed in the guide hole 21 in the female connector 13 and the guide bushing 77 could be disposed in the guide hole 35 in the male connector 15 without departing from the scope of the invention. Moreover, the guide pin 75 and guide bushing 77 can be located in a hole other than the center hole 21, 35. The guide pin generally indicated at 75 has a base 79 and a stem 81 extending from the base. The base 79 is disposed in the guide hole 35 in the connector body 31 of the male connector 15 and the stem 81 extends from the connector body past the connector portion 41 of the male connector's shell 33. A swage roll-over tool 91 may be used to swage the guide pin 75 to the connector body 31 of the male connector 15 (FIG. 10). The base 79 is also knurled at 83 to engage an inner surface of the guide hole 35 to further secure the base in the guide hole by an interference fit with the connector body 31. The guide pin 75 centers itself in the guide hole 35 by displacement of material of the connector body 31 as the guide pin is pressed into the guide hole. The stem 81 of the guide pin 75 tapers at a free end of the pin providing a narrowed tip for aiding in initially locating the guide pin in the guide bushing 77. In the illustrated embodiment, the guide pin 75 is generally cylindrical. However, the guide pin can have other configurations such as rectangular or triangular without departing from the scope of the present invention.

Figure 6:
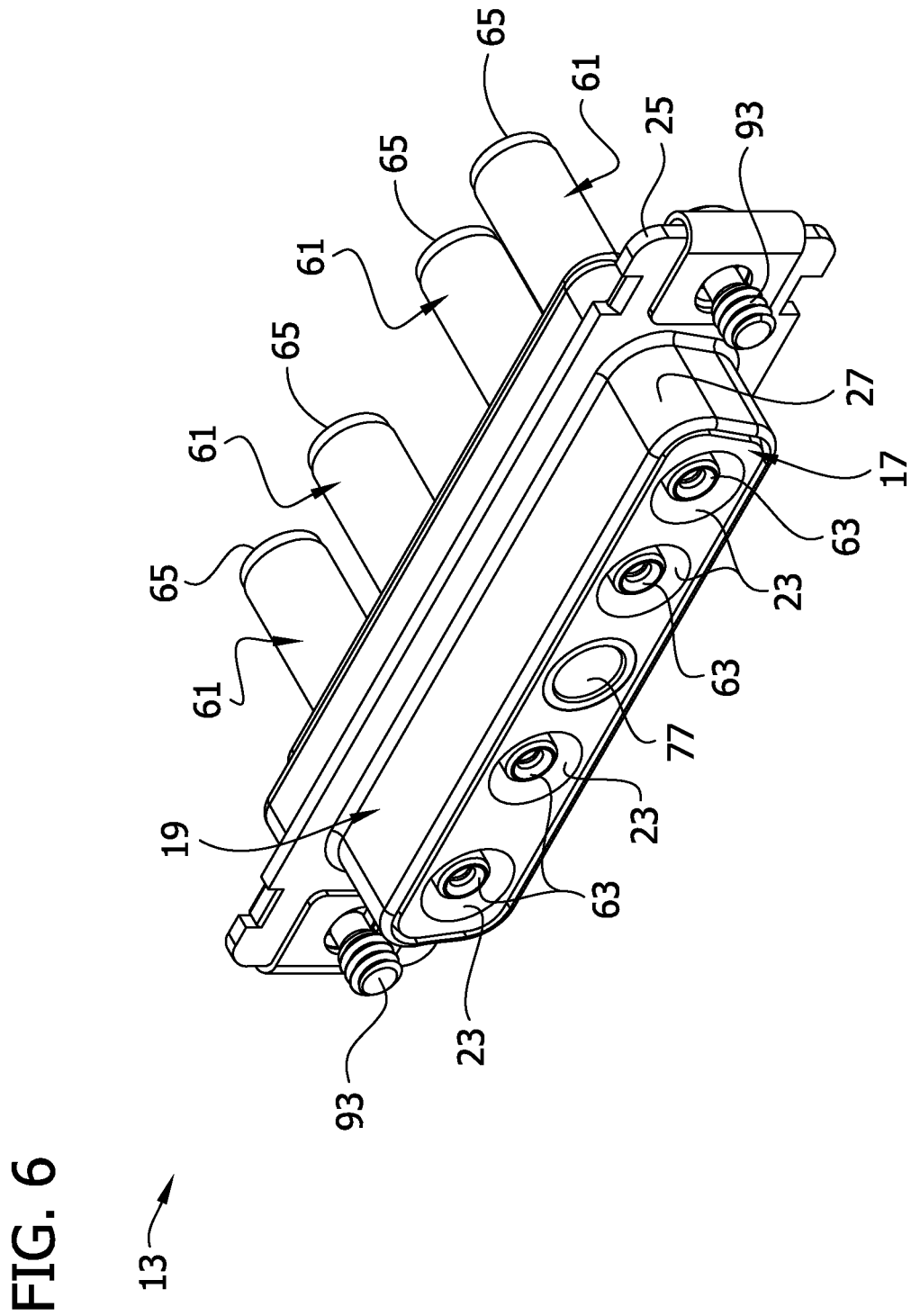
FIG. 6 is a front perspective of a female D-Sub connector of the D-Sub connector assembly with fiber optic termini removed for greater clarity.

Referring to FIGS. 5, 6 and 7, the guide bushing 77 comprises a hollow member having a knurled end portion 85. The knurled end portion 85 engages an inner surface of guide hole 21 to secure the bushing in guide hole by an interference fit. Press fitting the bushing 77 into the guide hole 21 allows the bushing to center itself in the guide hole by displacing material of the female connector body 17. A swage roll-over tool like tool 91 in FIG. 10 may be used to swage an end of the guide bushing 77 against the connector body 17 of the female connector 13. In the illustrated embodiment, the guide bushing 77 is a hollow cylindrical member. However, the guide bushing can have other configurations such as a hollow rectangular or triangular member without departing from the scope of the invention.

Figure 11:
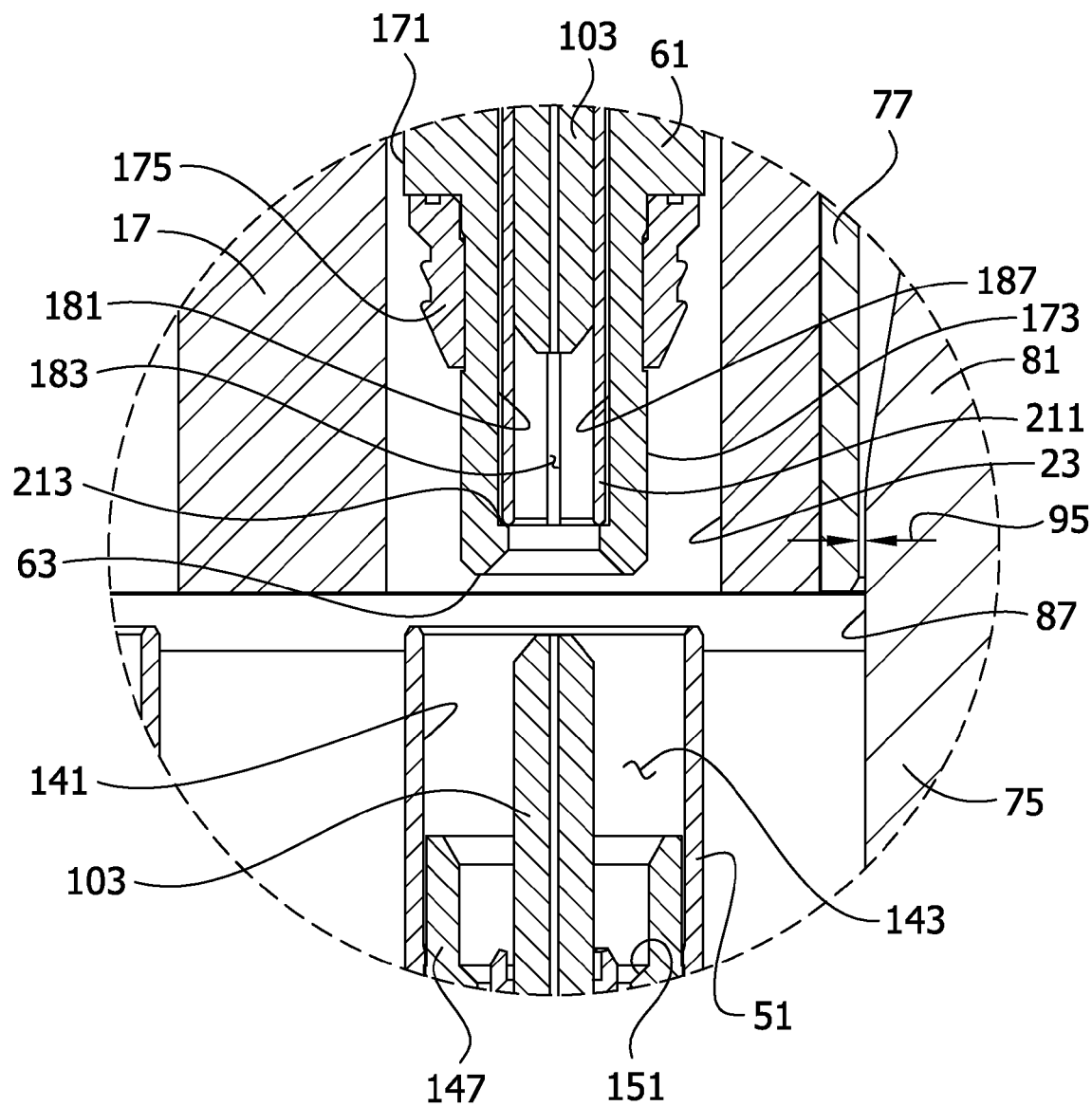
FIG. 11 is an enlarged detail of the section of FIG. 5.
Figure 12:
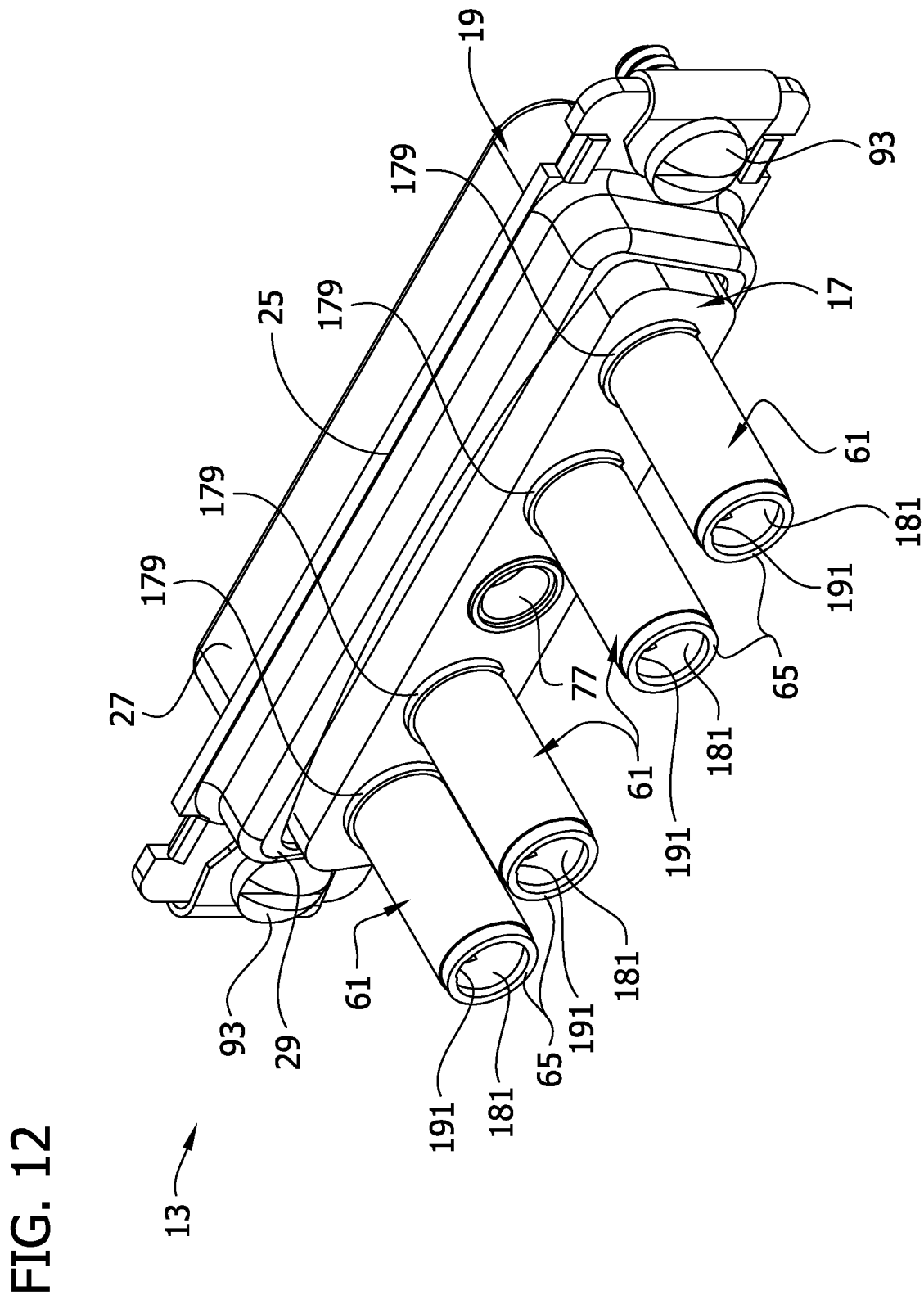
FIG. 12 is a rear perspective of the female D-Sub connector.

When the female connector 13 is mated with the male connector 15 the stem 81 of the guide pin 75 is received in the guide bushing 77. A maximum outer diameter portion 87 of the stem 81 fits inside the bushing 77 in close tolerance with the inner surface of the bushing to guide connection of the connectors. Fastener holes 89 in the flanges 25, 39 are also aligned and can receive fasteners 93 to fix the connectors 13, 15 together. The fit between the guide pin 75 and the guide bushing 77 comprises a clearance fit (FIG. 11). In a preferred embodiment, the clearance fit forms a clearance 95 of about 0.0005 inches (0.013 mm) to about 0.0015 inches (0.038 mm) between the maxim outer diameter portion 87 of the stem 81 of the guide pin 75 and the inner surface of the guide bushing 77. The outer diameter of the guide pin 75 and the inner diameter of the bushing can be held to a tolerance of about ±0.0005 inches (0.013 mm). In the illustrated embodiment, the maximum outer diameter portion 87 of the guide pin 75 is between about 0.150 inches (3.81 mm) and about 0.151 inches (3.84 mm), and the inner diameter of the guide bushing 77 is between about 0.152 inches (3.86 mm) and about 0.153 inches (3.89 mm). However, the dimensions of the pin and bushing, and the clearance may be other than described herein. The guide pin 75 and guide bushing 77 may both be formed from metal or any other suitable material.

Referring to FIGS. 16-19, the first and second contacts 71, 73 may comprise fiber optic termini such as the ARINC 801 fiber optic termini sold by Radiall of Rosny Sous Bois, France. Each terminus 71, 73 comprises a body 101 and a ferrule 103 extending from the body. The body 101 includes a first section 105 and a recessed second section 107 extending from the first section forming a shoulder 109. A key 111 is disposed on the first section 105 of the body 101. A spring 113 (FIG. 20) is housed in the body 101 and biases the ferrule 103 toward an extended position. As will be explained in greater detail below, when the fiber optic termini 71, 73 are attached to the connectors 13, 15 by the adapters 51, 61, connecting the female connector 13 to the male connector 15 engages the ferrules 103 of the termini 71, 73 optically interfacing the first terminus 71 attached to the male connector 15 with the second terminus 73 attached to the female connector 13 (FIG. 23). Other fiber optic termini are within the scope of the present invention.

Figure 9A:
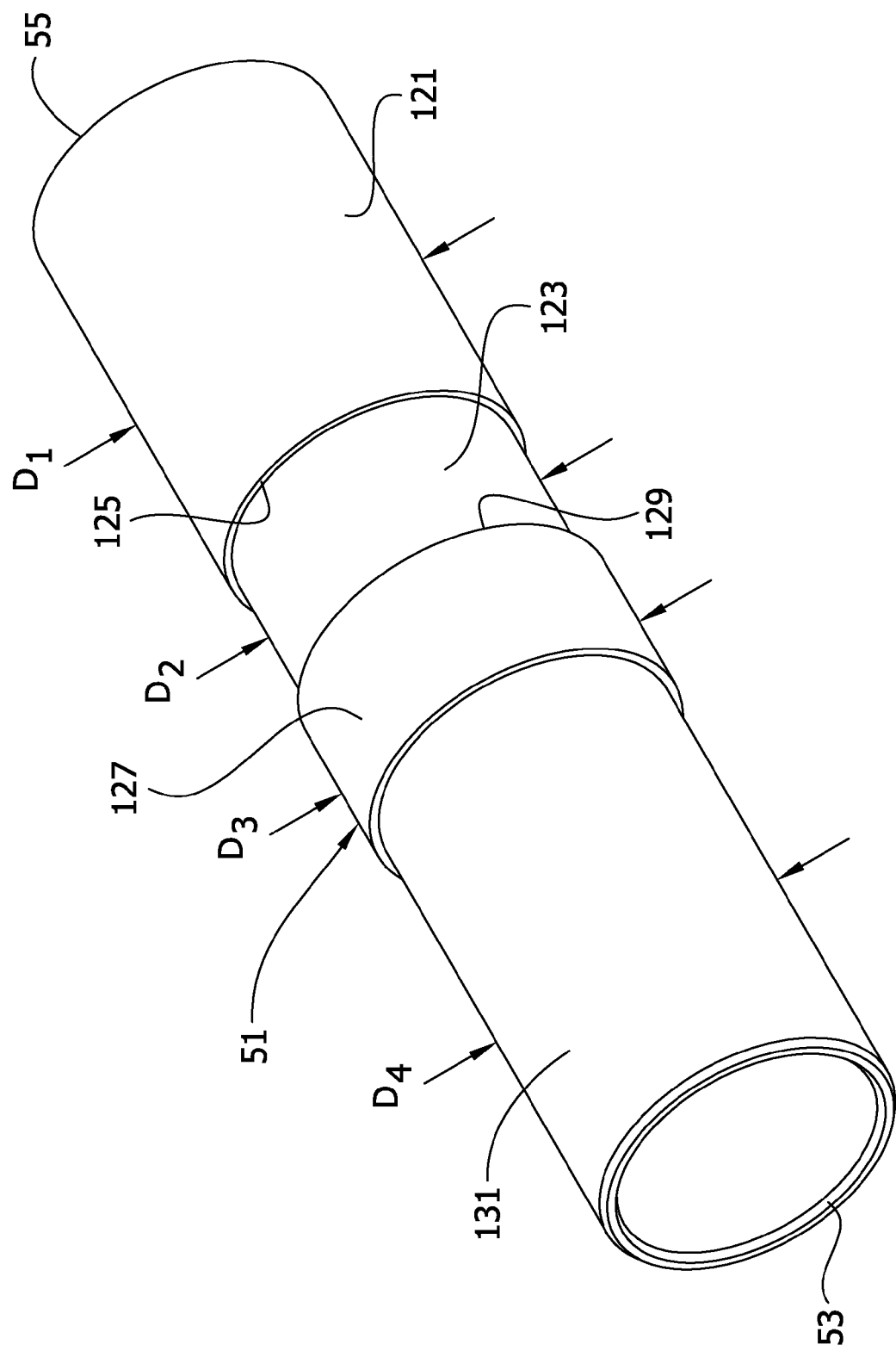
FIG. 9A is an enlarged perspective of a male adapter of the connector assembly.

Referring to FIGS. 9, 9A, 15 and 15A, the adapters 51 in the first set each comprise a hollow cylindrical member having a first portion 121 at the attachment end 55 of the adapter. Referring particularly to FIG. 9A, the first portion 121 has an outer diameter $D_1$. A second portion 123 extends from the first portion 121 toward the interface end 53 of the adapter 51 and has an outer diameter $D_2$ that is smaller than the outer diameter $D_1$ of the first portion forming a first shoulder 125. A third portion 127 extends from the second portion 123 toward the interface end 53 and has an outer diameter $D_3$ that is larger than the outer diameter $D_2$ of the second portion forming a second shoulder 129. Diameter $D_3$ is also larger than diameter $D_1$. The second portion 123 defines a recess in the outer surface of the adapter 51. A fourth portion 131 extends from the third portion 127 to the interface end 53 of the adapter 51 and has an outer diameter $D_4$ that is smaller than the outer diameter $D_3$ of the third portion. The second shoulder 129 engages a lip 135 on the inner surface of the contact hole 37 in the connector body 31 and a c-clip 137 (broadly, "securing member") is removably received in the recess between the first shoulder 125 and an outer face of the connector body to secure the adapter 51 in the contact hole. The nondestructively removable nature of the c-clip 137 allows the adapter 51 to be releasably secured in the contact hole 37.

The adapters 51 in the first set associated with the male connector 15 each have a cylindrical inner surface 141 forming an internal passage 143. A keyway 145 is formed in the inner surface 141 and extends from the attachment end 55 of the adapter 51 toward the interface end 53. In the illustrated embodiment, the keyway 145 is a longitudinal recess in the inner surface 141 of the adapter 51. An alignment bushing 147 is disposed inside the adapter 51 and has a longitudinal slot 149 that is aligned with the keyway 145. An annular stop 151 is formed in an inner surface of the bushing 147 and extends into the internal passage 143 and is disposed nearer to the interface end 53 of the adapter 51. A retaining clip 153 is disposed in the adapter 51 at the attachment end 55 of the adapter. The retaining clip 153 comprises a semi-cylindrical member having a base 155 and tines 157 extending from the base (see, FIGS. 9, 19A and 20A). The tines 157 are deflectable attached to the base 155 so the tines can flare or spread outward when engaged by a terminus 71. The retaining clip 153 is angularly offset from the keyway 145 so as not to interfere with the key 111 on the terminus 71 when the terminus is inserted into the adapter 51. In one embodiment, the tines 157 of the retaining clip 153 are offset 90 degrees from the keyway 145. As will be explained in greater detail below, the adapters 51 in the first set are male adapters.

Figure 7A:
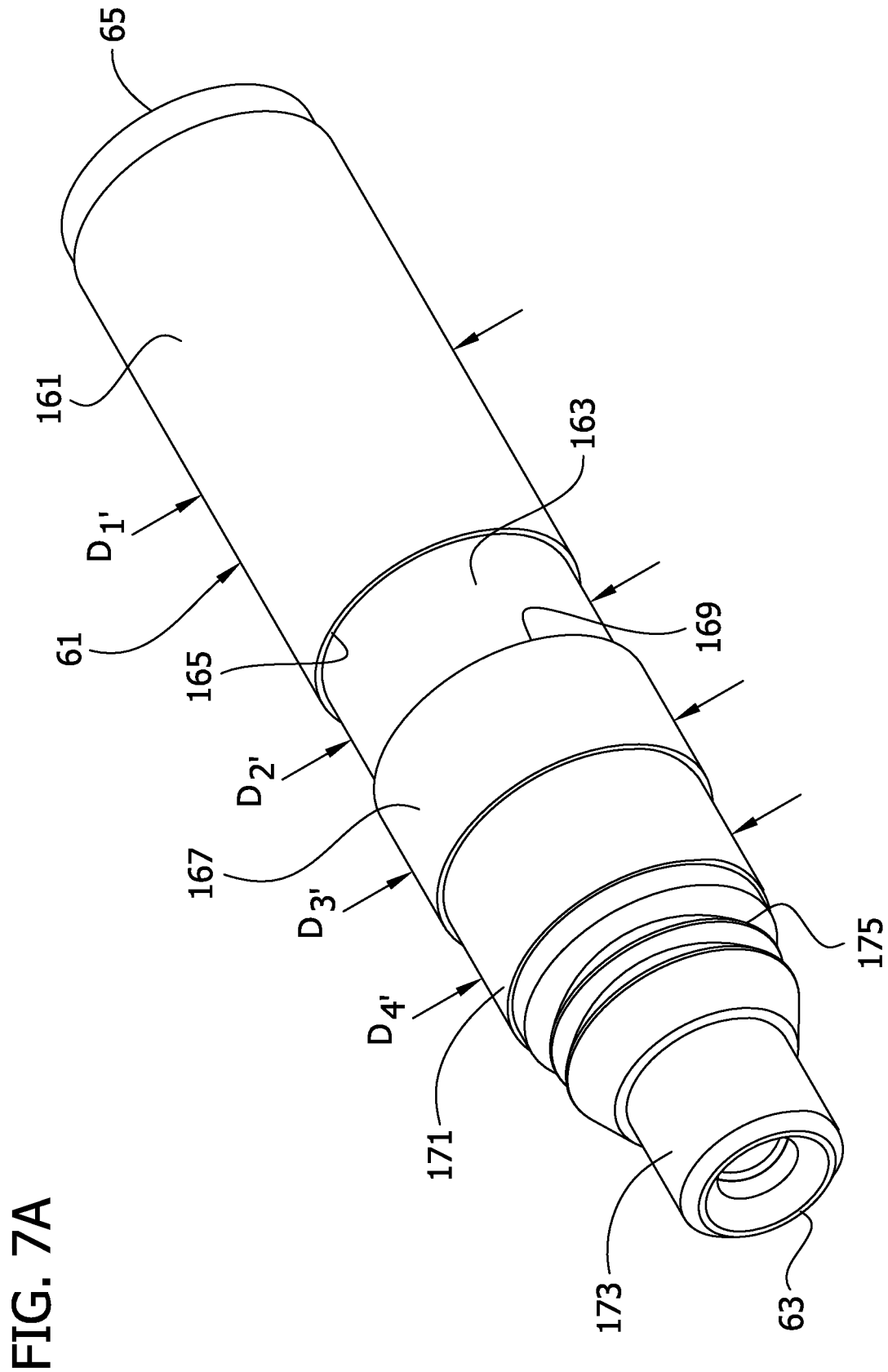
FIG. 7A is an enlarged perspective of a female adapter of the connector assembly.
Figure 13:
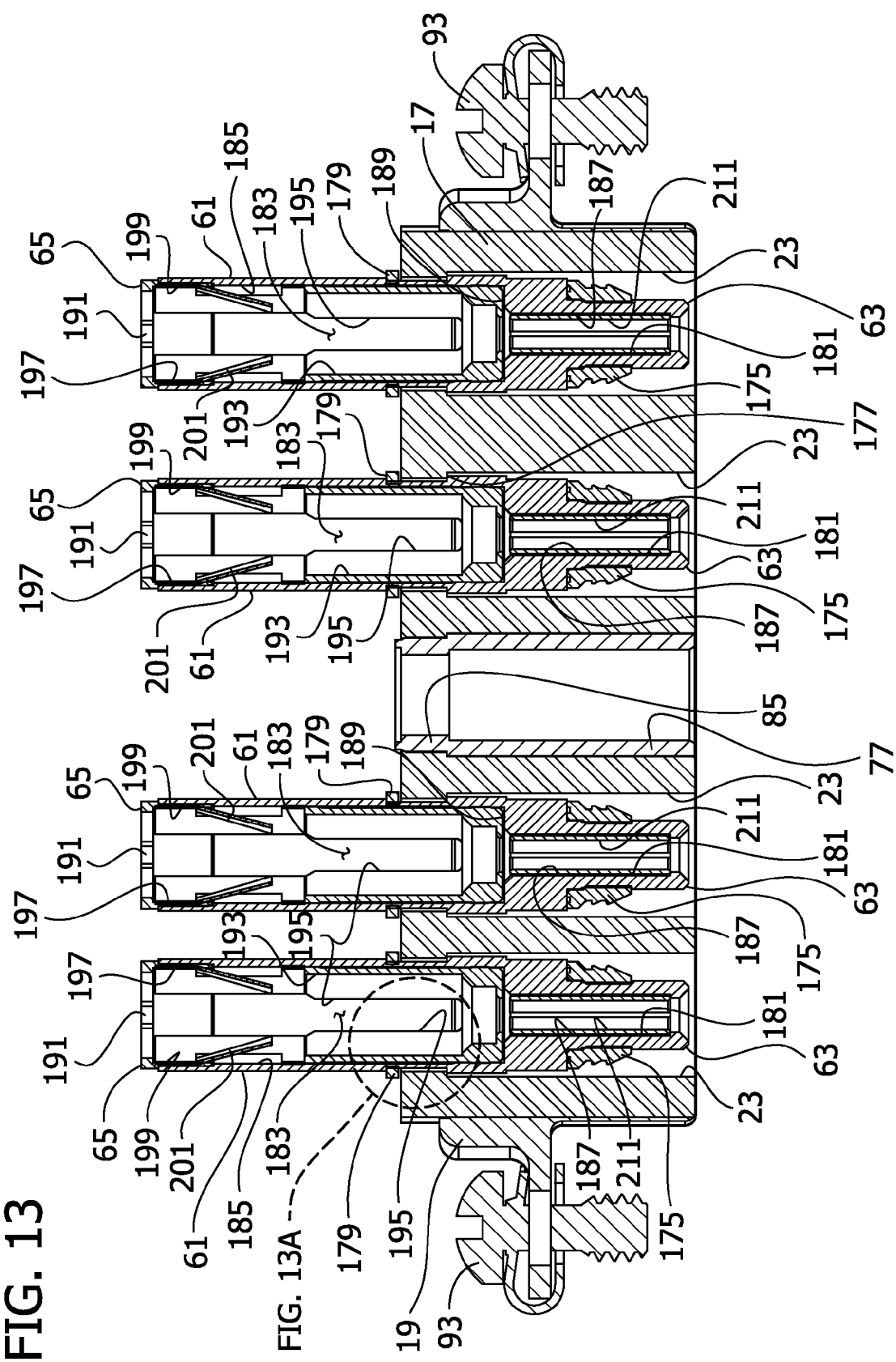
FIG. 13 is a section of the female D-Sub connector with fiber optic termini removed for greater clarity.
Figure 13A:
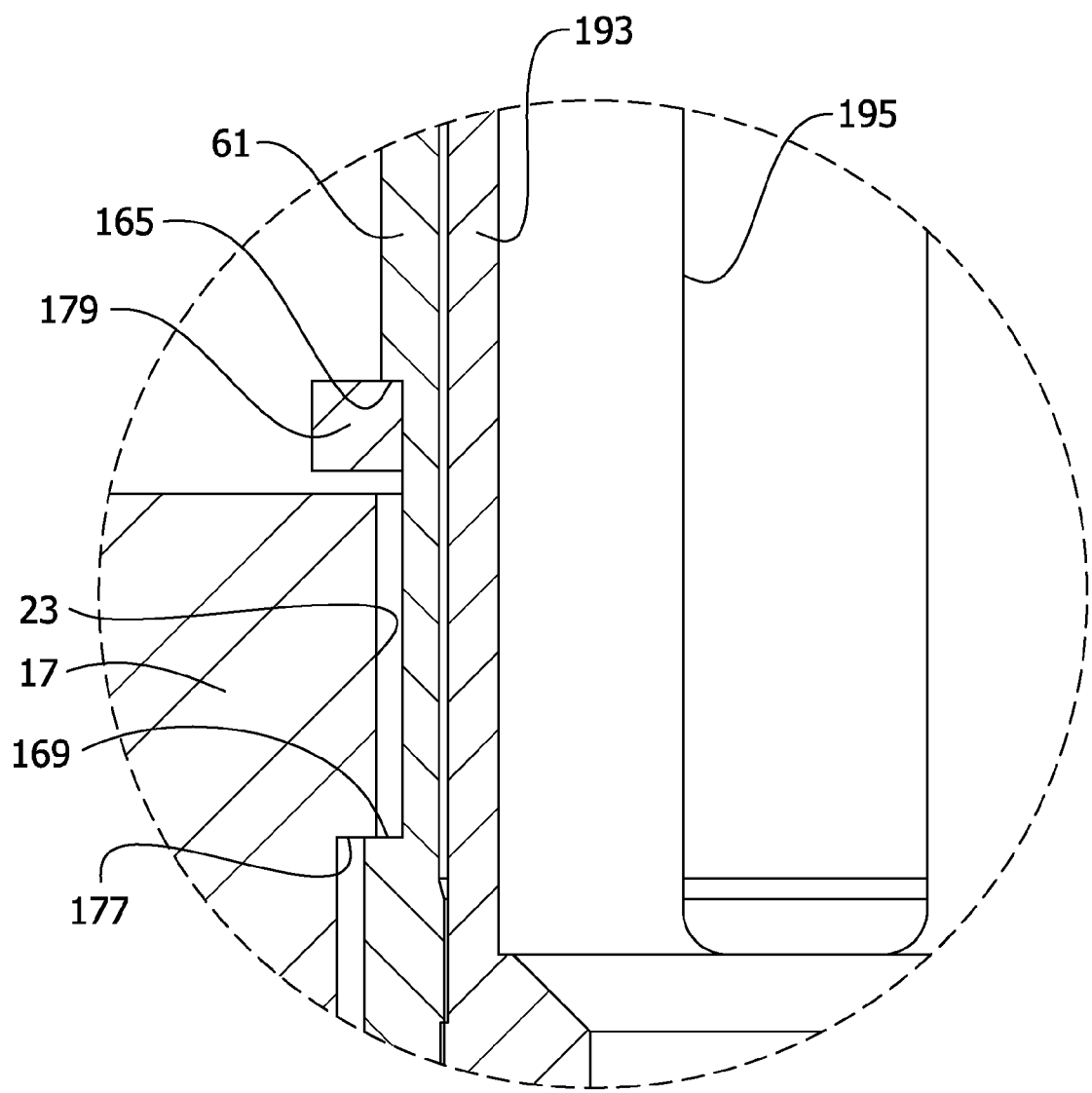
FIG. 13A is an enlarged detail of the section of FIG. 13.
Figure 14:
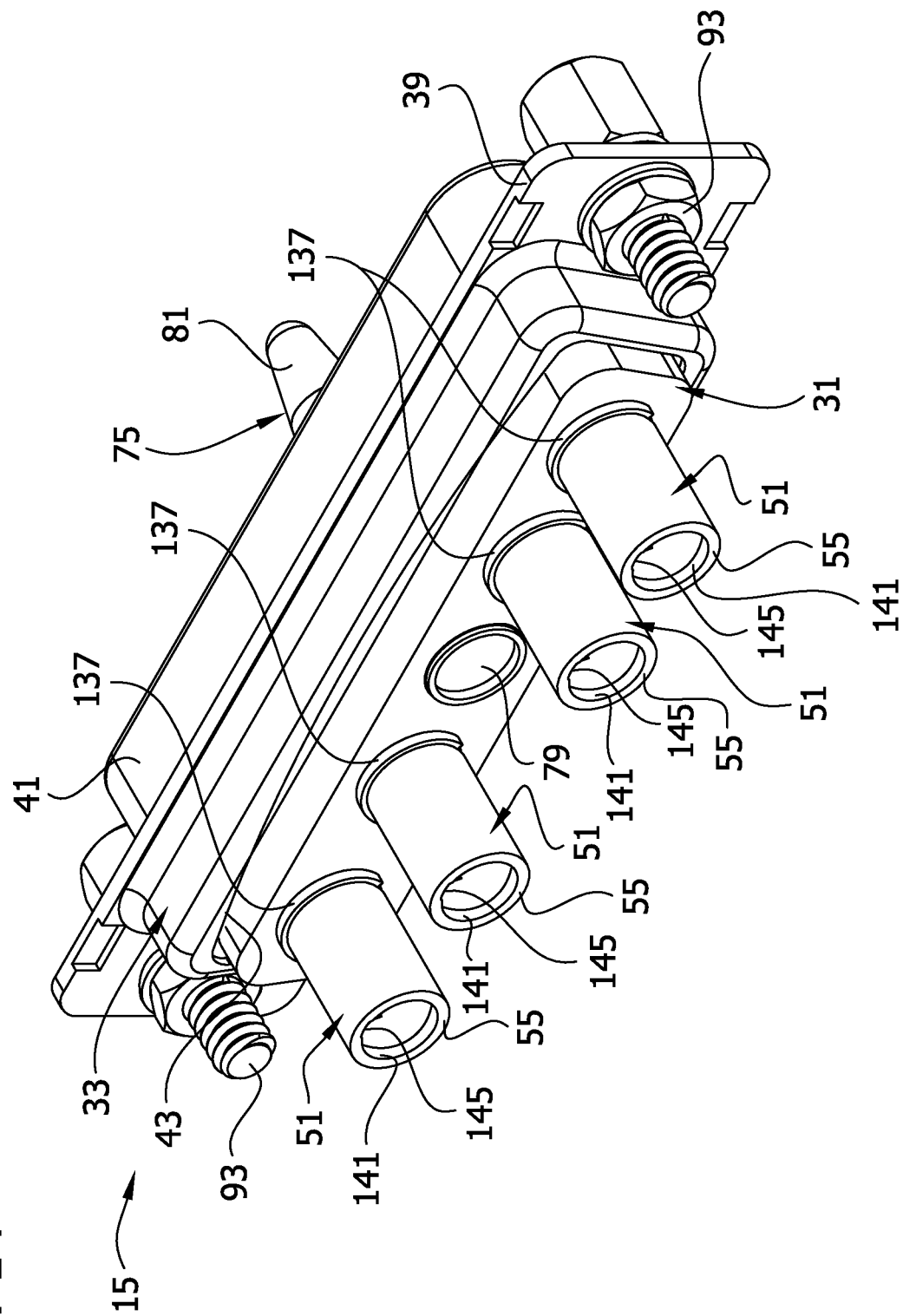
FIG. 14 is a rear perspective of the male D-Sub connector.
Figure 15A:
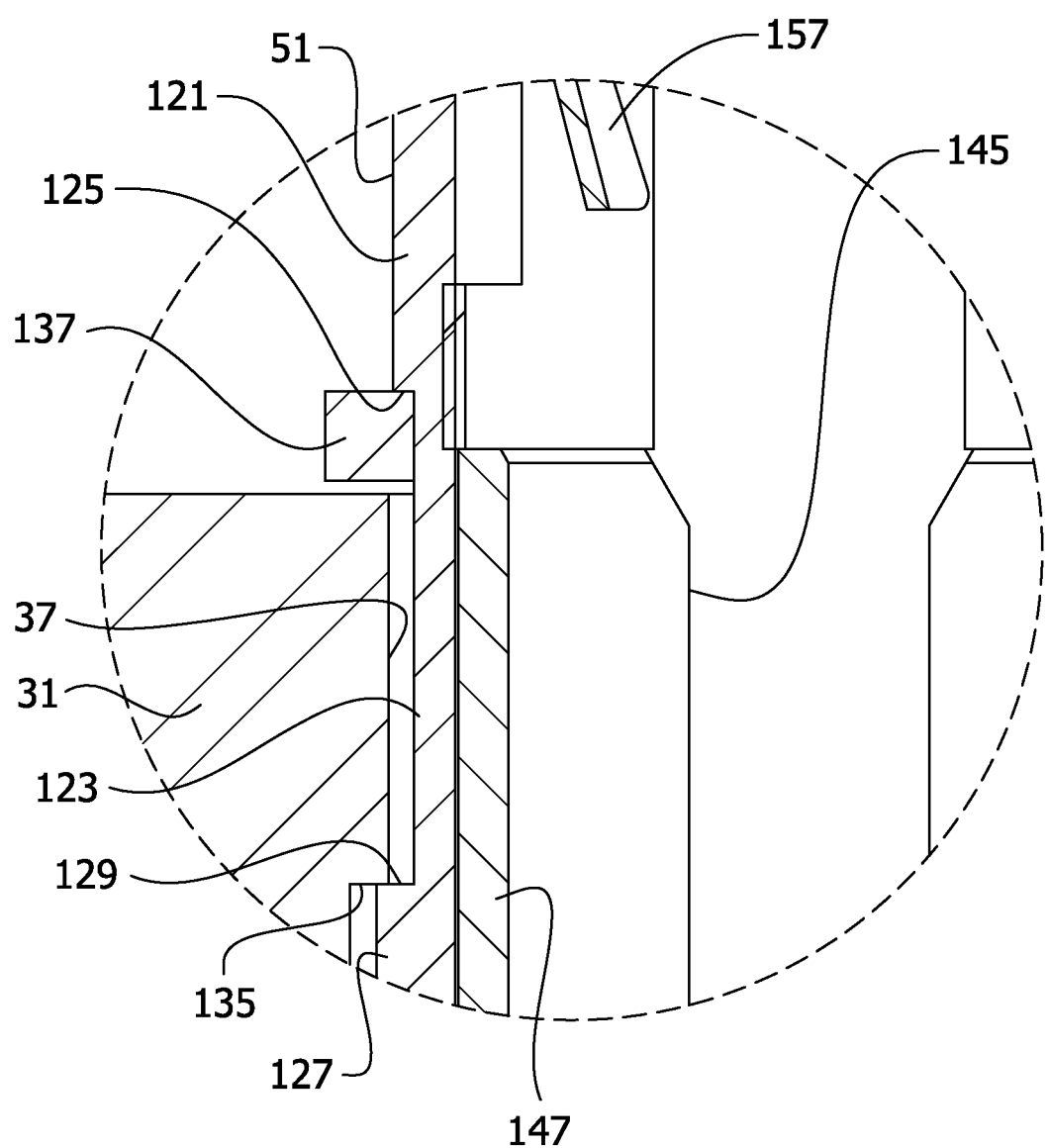
FIG. 15A is an enlarged detail of the section of FIG. 15.
Figure 16:
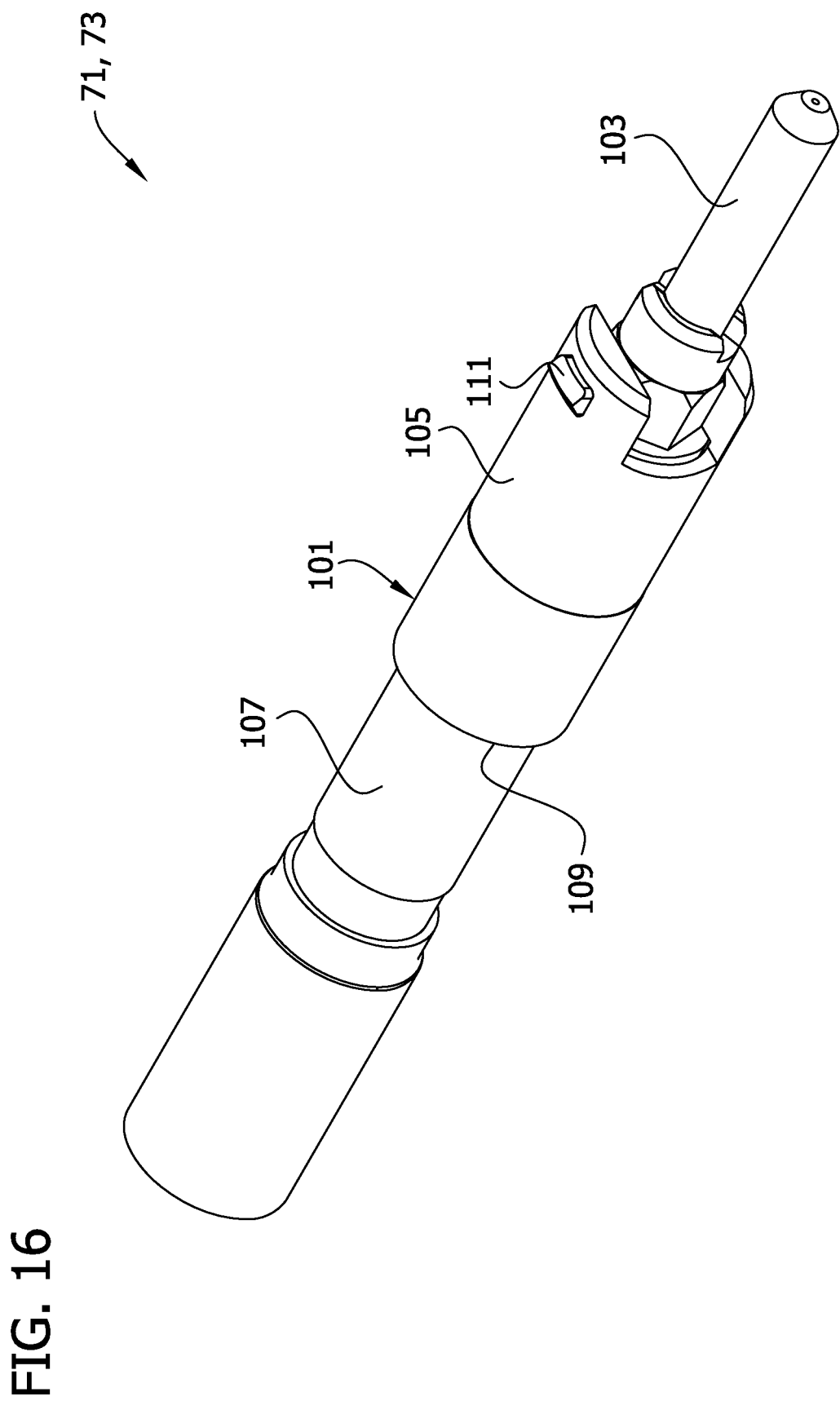
FIG. 16 is a perspective of a fiber optic terminus for use with the D-Sub connector assembly.
Figure 17:
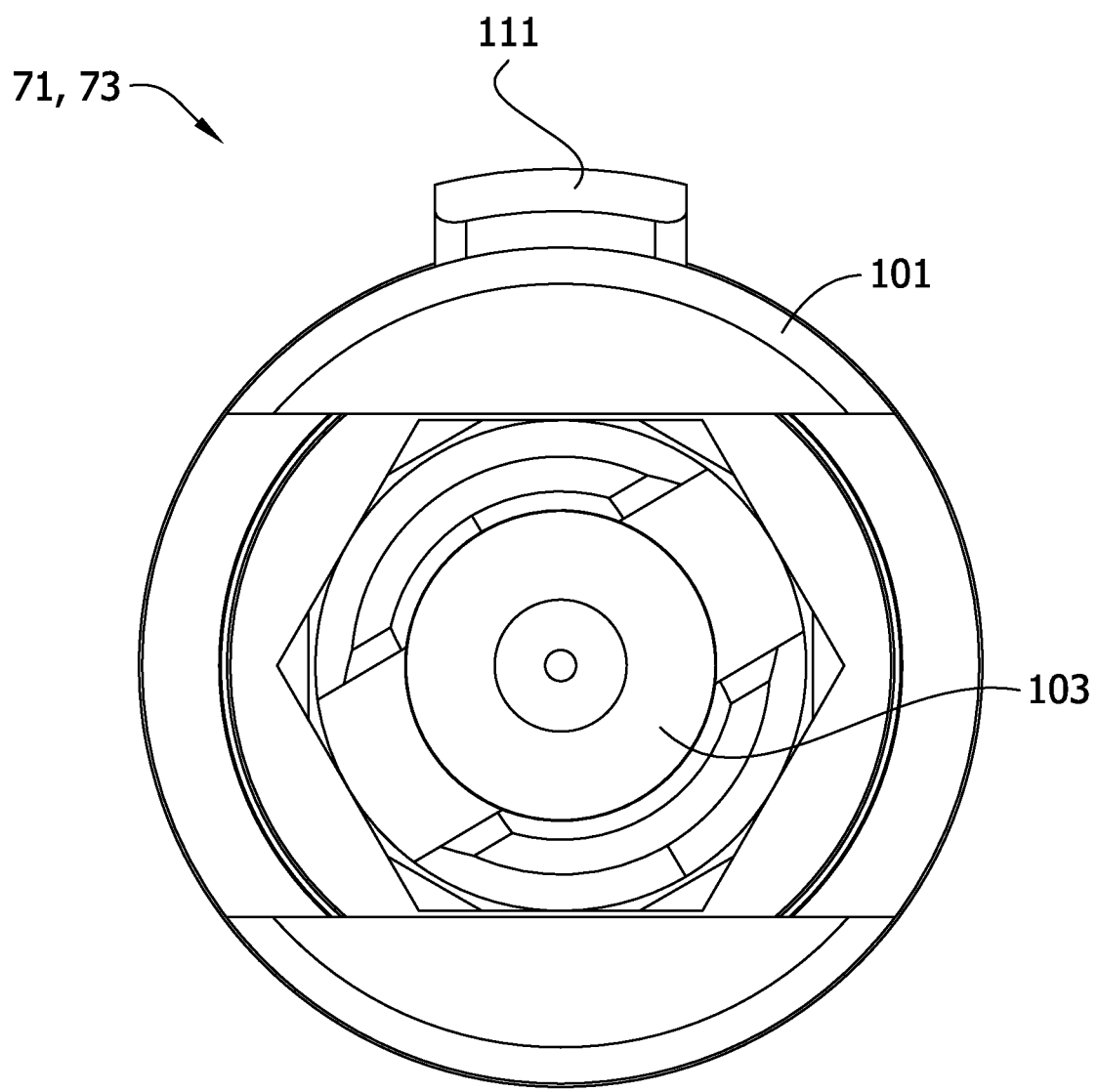
FIG. 17 is a front view of the fiber optic terminus.
Figure 23A:
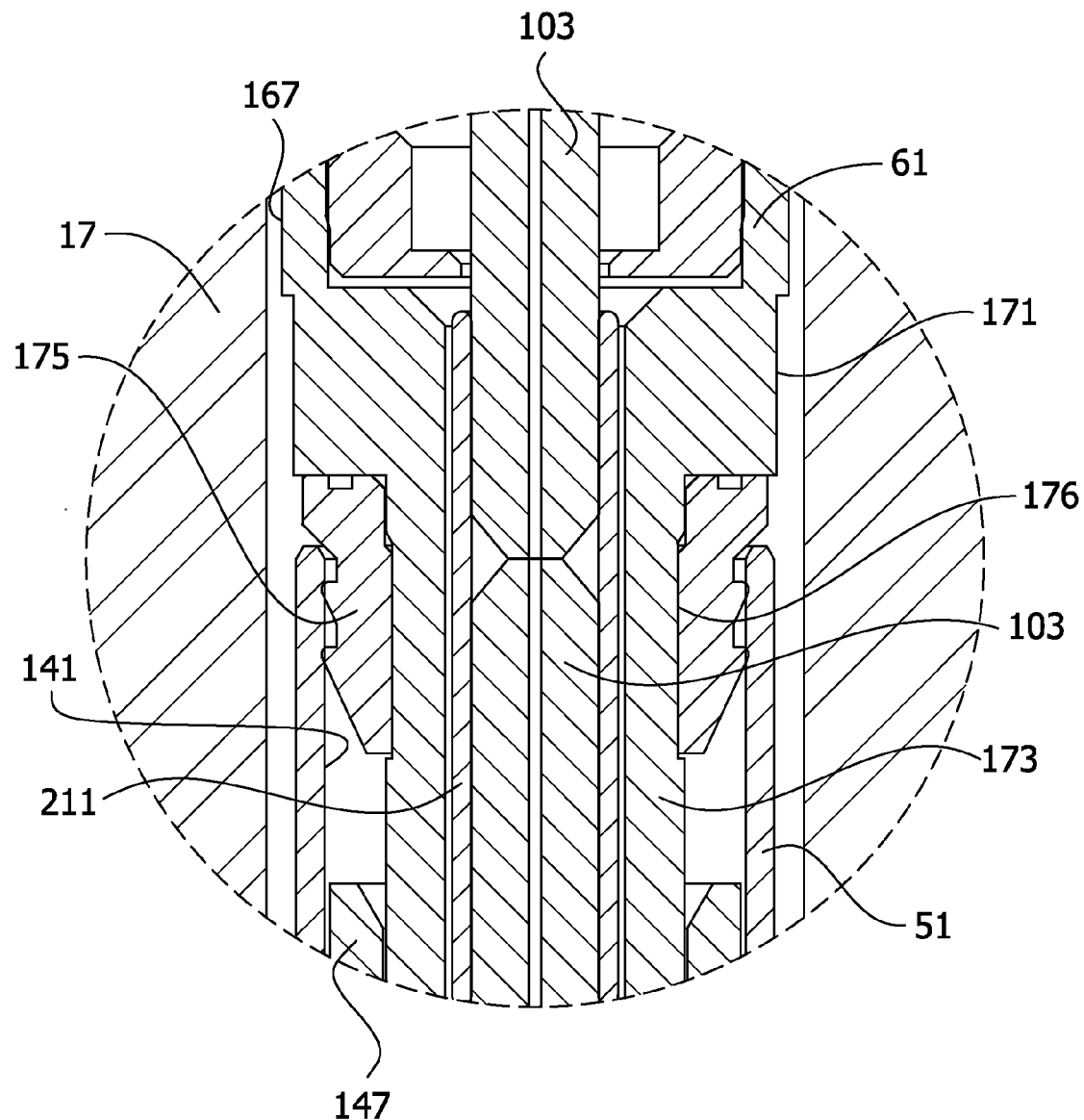
FIG. 23A is an enlarged detail of the section of FIG. 23.

Referring to FIGS. 6, 7, 7A, 12 and 13, the adapters 61 in the second set associated with the female connector 13 comprise a hollow cylindrical member having a first portion 161 at the attachment end of the adapter. Referring particularly to FIG. 7A, the first portion 161 has an outer diameter $D_{1'}$. A second portion 163 extends from the first portion 161 toward the interface end 63 of the adapter 61 and has an outer diameter $D_{2'}$ that is smaller than the outer diameter $D_{1'}$ of the first portion forming a first shoulder 165. A third portion 167 extends from the second portion 163 toward the interface end 63 and has an outer diameter $D_{3'}$ that is larger than the outer diameter $D_{2'}$ of the second portion forming a second shoulder 169. The outer diameter $D_{3'}$ is also larger than outer diameter $D_{1'}$. The second portion 163 defines a recess in the outer surface of the adapter 61. A fourth portion 171 extends from the third portion 167 toward the interface end 63 of the adapter 61 and has an outer diameter $D_{4'}$ that is smaller than the outer diameter $D_{3'}$ of the third portion. A nose portion 173 extends from the fourth portion 171 to the interface end 63 of the adapter 61. A dust seal 175 (FIG. 13) is disposed around the nose portion 173 by friction fit and preferably without adhesive. A portion of the dust seal 175 may be received in a recess 176 in an outer surface of the nose portion 173 (FIG. 23A). The second shoulder 169 engages a lip 177 on the inner surface of the contact hole 23 in the connector body 17 and a c-clip 179 (broadly, "securing member") is removably received in the recess between the first shoulder 165 and an outer face of the connector body to secure the adapter 61 in the contact hole 23 (FIG. 13A). The nondestructively removable nature of the c-clip 179 allows the adapter 61 to be releasably secured in the contact hole 23.

The adapters 61 in the second set each have a cylindrical inner surface 181 forming an internal passage 183. The inner surface 181 comprises a wider section 185 having an inner diameter and a narrower section 187 having an inner diameter that is smaller than the inner diameter of the wider section. A shoulder 189 is formed between the sections 185, 187. A keyway 191 is formed in the wider section 185 of the inner surface 181 and extends from the attachment end 65 of the adapter 61 toward the interface end 63. In the illustrated embodiment, the keyway 191 is a longitudinal recess in the inner surface 181 of the adapter 61. An alignment bushing 193 is disposed inside the adapter 61 and has a longitudinal slot 195 that is aligned with the keyway 191. The bushing 193 seats on the shoulder 189. A retaining clip 197 is disposed in the adapter 61 at the attachment end 65 of the adapter. The retaining clip 197 comprise a semi-cylindrical member having a base 199 and tines 201 extending from the base. The tines 201 are deflectably attached to the base 199 so the tines can flare or spread outward when engaged by a terminus. The retaining clip 197 is angularly offset from the keyway 191 so as not to interfere with the key 111 on the terminus 73 when the terminus is inserted into the adapter 61. In a preferred embodiment, the tines 201 of the retaining clip 197 are offset 90 degrees from the keyway 191. A ceramic sleeve 211 is disposed inside the narrower section 187 and is allowed to float between the bushing 193 and a stop 213 (FIG. 11). As will be explained in greater detail below, the adapters 61 in the second set are female adapters sized and shaped for insertion into the male adapters 51.

Figure 18:
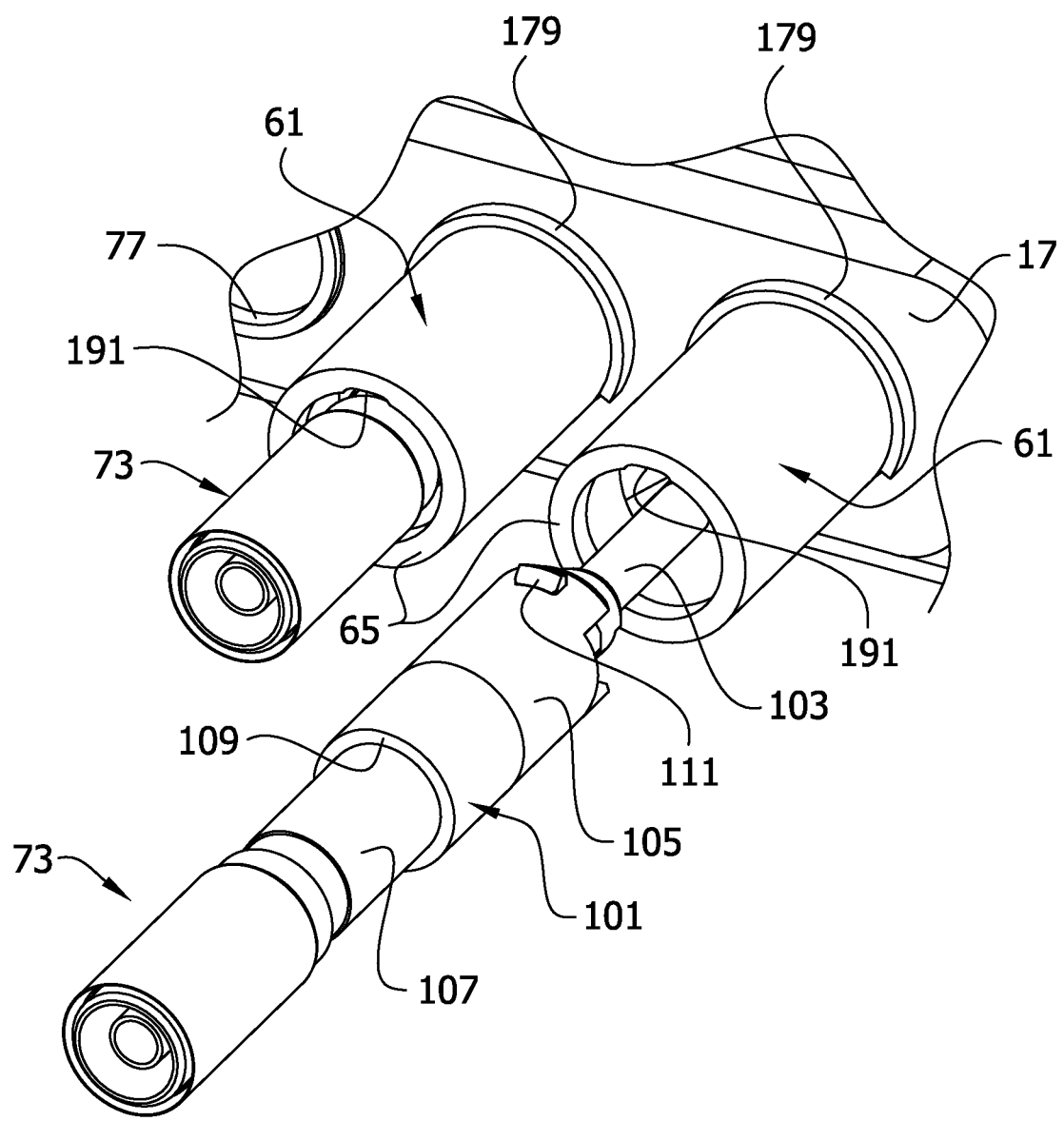
FIG. 18 is an enlarged fragmentary perspective of a fiber optic terminus partially inserted into a female fiber optic adapter assembly of the female D-Sub connector.
Figure 19:
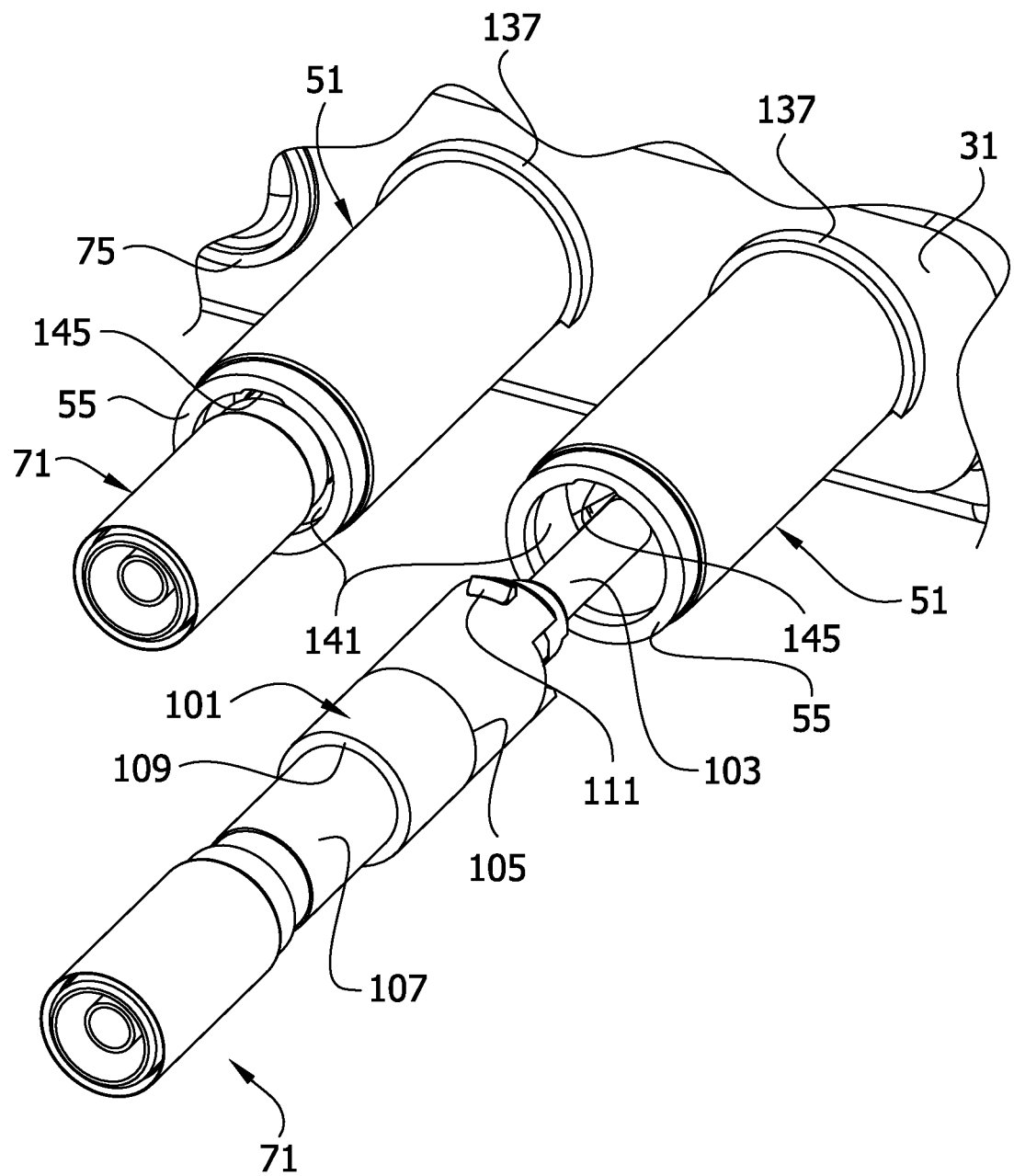
FIG. 19 is an enlarged fragmentary perspective of a fiber optic terminus partially inserted into a male fiber optic adaptor assembly of the male D-Sub connector.
Figure 19A:
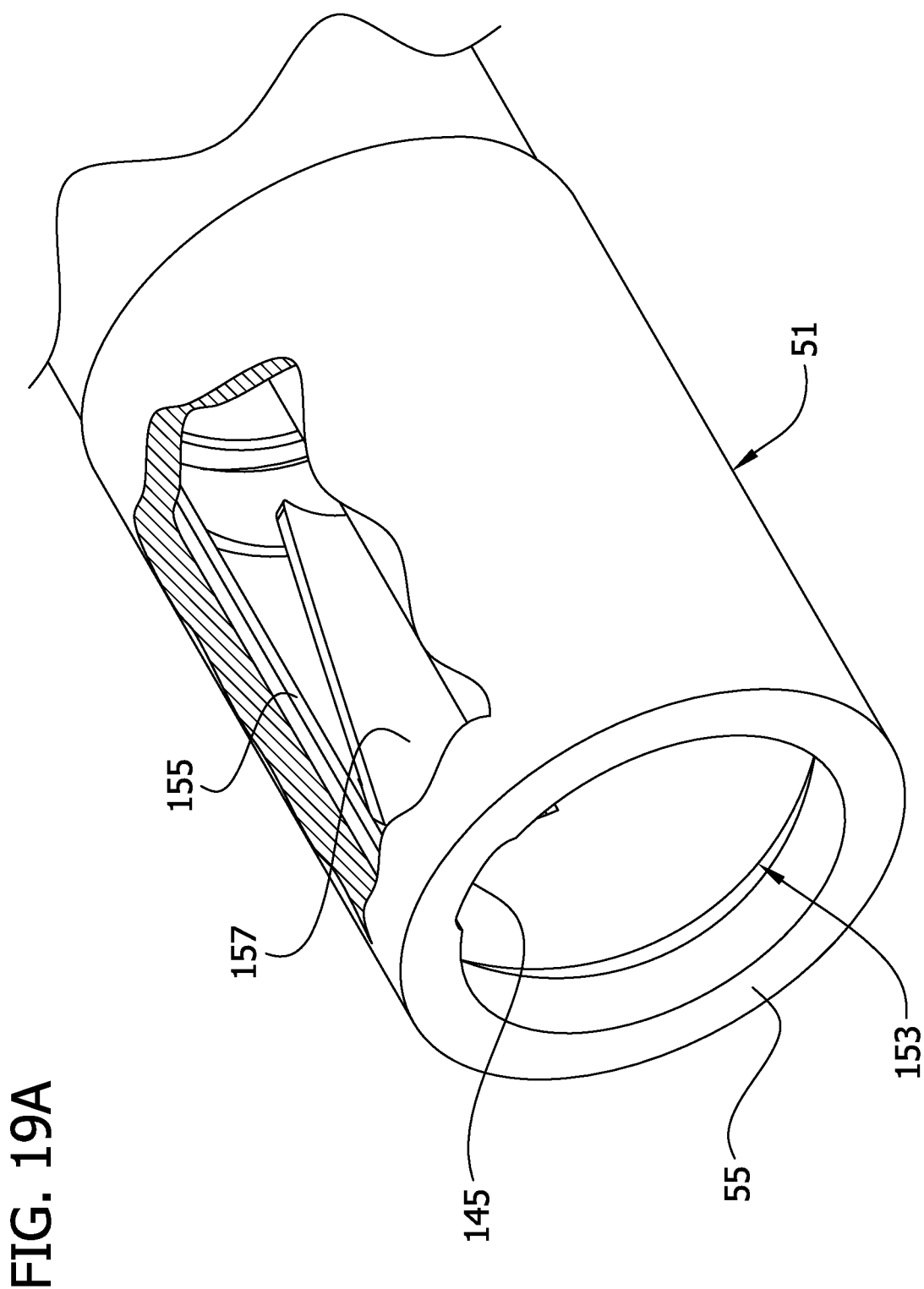
FIG. 19A is an enlarged perspective of the male fiber optic adapter assembly with a portion broken away to show internal construction.
Figure 20:
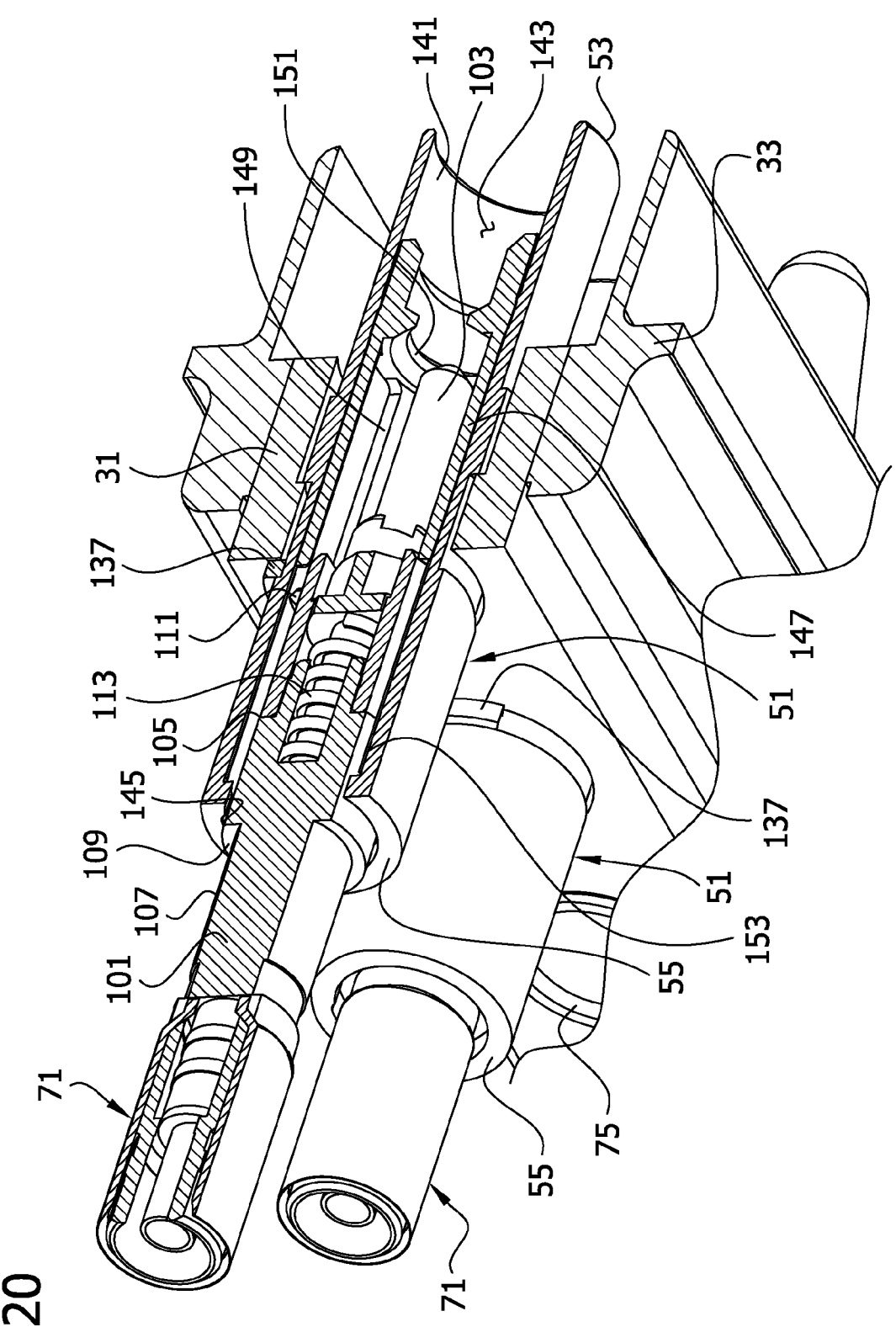
FIG. 20 is a fragmentary perspective of the male D-Sub connector in section showing a fiber optic terminus partially inserted into the male fiber optic adapter assembly.
Figure 20A:
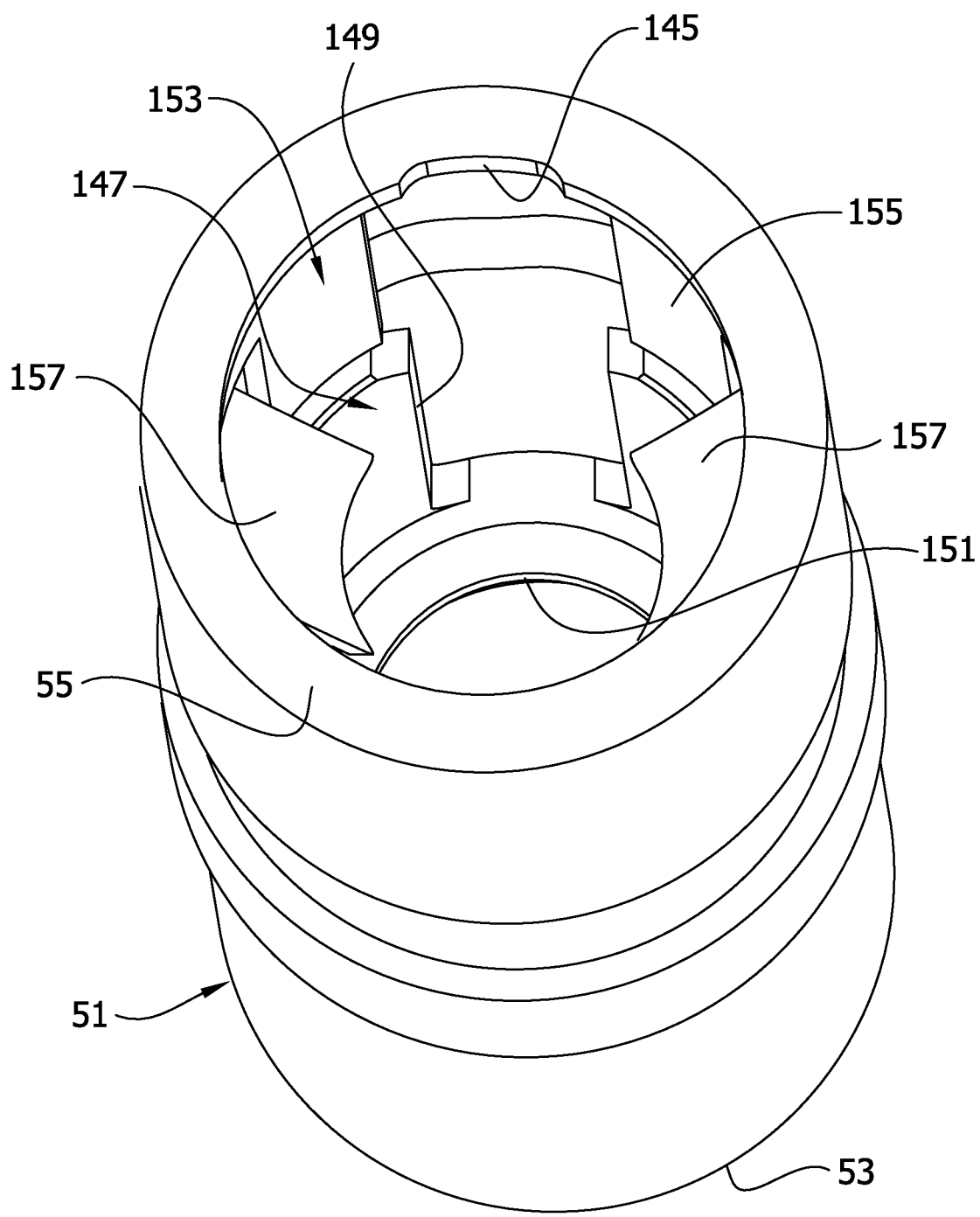
FIG. 20A is a perspective of the male fiber optic adapter assembly.
Figure 21:
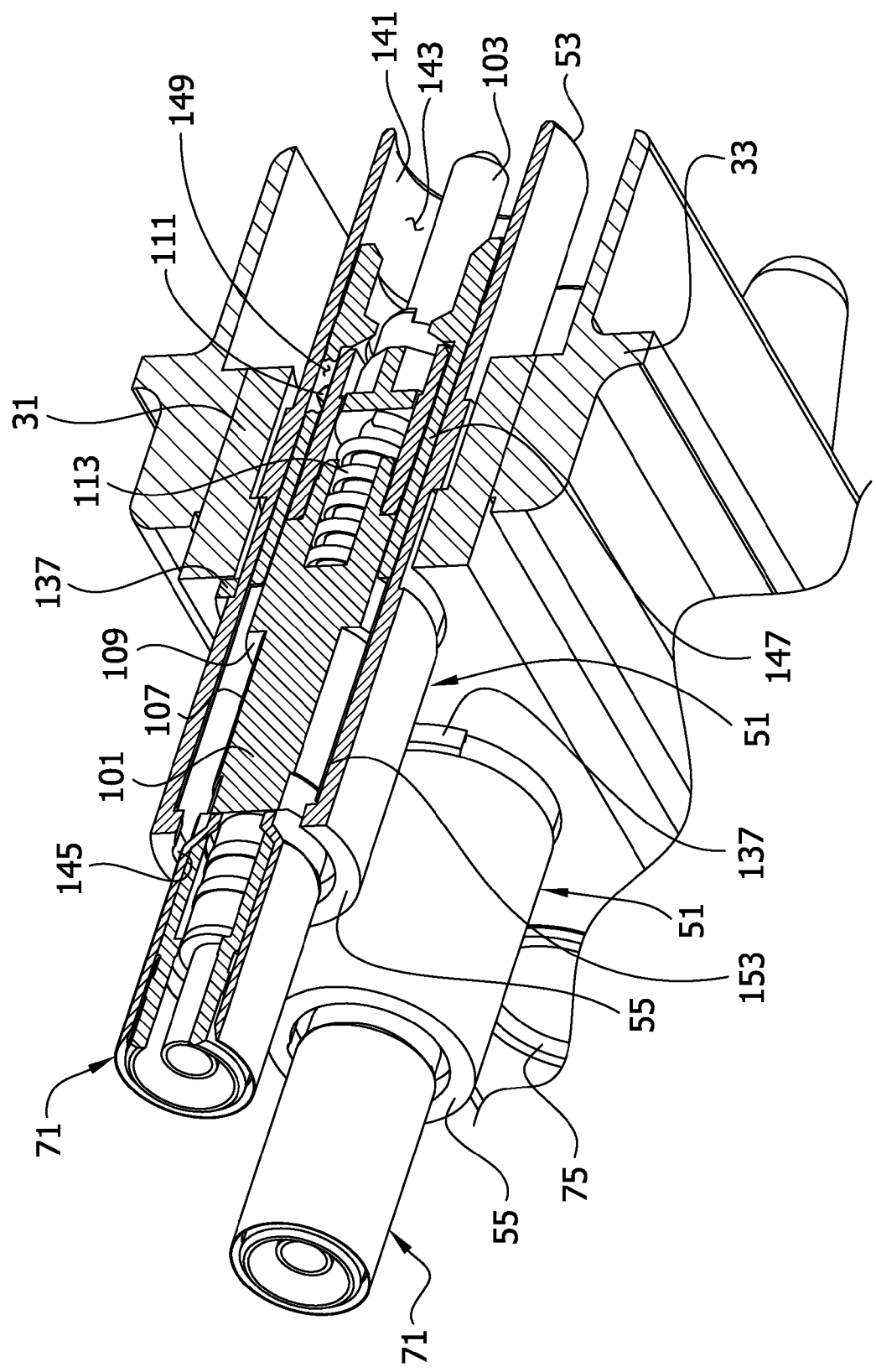
FIG. 21 is the fragmentary perspective of FIG. 20 but showing a fiber optic terminus fully inserted into the male fiber optic adapter assembly.
Figure 22:
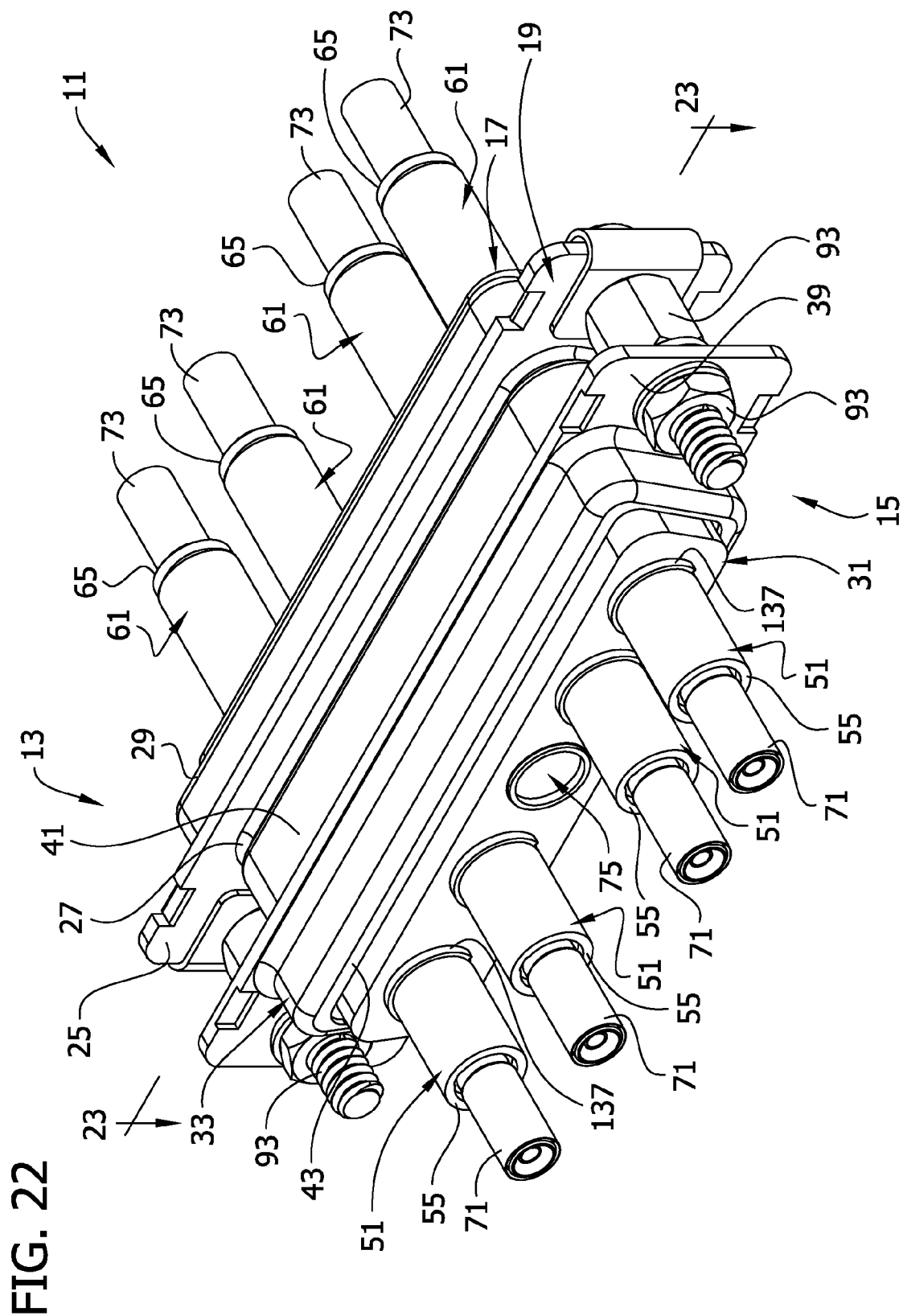
FIG. 22 is a perspective of the D-Sub connector assembly in a fully mated state.

Referring to FIGS. 19-21, both the male and female adapters 51, 61 are configured for attaching the fiber optic termini 71, 73 to the respective connectors 13, 15. To attach a terminus 71 to the male connector 15, the key 111 on the terminus is aligned with the keyway 145 in the male adapter 51 and the terminus is inserted into the attachment end 55 of the male adapter and into the internal passage 143. The keyway 145 guides the key 111 into the slot 149 in the bushing 147 (FIG. 20A). The male adapter 51 will permit the terminus 71 to be inserted into the adapter only when the key 111 is aligned with the keyway 145. As the terminus 71 is being inserted into the adapter 51, the first section 105 of the terminus will engage the tines 157 of the retaining clip 153 and spread the tines outward allowing the first section to move past the retaining clip. Once the first section 105 of the terminus 71 is inserted past the retaining clip 153, the tines 157 will drop down to the recessed second section 107 of the body 101 and engage the shoulder 109 holding the terminus in the male adapter 51. A terminus 73 is attached and retained to the female adapter 61 in the same fashion (FIG. 18).

Referring to FIGS. 1, 5, 22, 23 and 23A, with the termini 71, 73 attached to the connectors 15, 13, the female connector 13 can be attached to the male connector 15 to optically interface the termini. The connectors can be brought together when the connector portion 27 of the female connector 13 is aligned with the connector portion 41 of the male connector 15. The guide pin 75 first engages the guide bushing 77 in the female connector 13 to guide further connection of the connectors. The guide pin 75 and bushing 77 interact to very precisely align the termini 71, 73 during connection of the connector 13, 15. After further connection, the connector portion 41 of the male connector 15 receives the connector portion 27 of the female connector 13. During connection of the adapters 51, 61, the nose portion 173 of the female adapter 61 is received in the bushing 147 in the male adapter 51 and seats on the stop 151 in the bushing 147. This causes the ferrules 103 of the termini 71, 73 to engage and create an optical interface between the termini (FIG. 23A). The springs 113 in the termini 71, 73 bias the ferrules 103 into engagement with each other. The close tolerance between the guide pin 75 and the guide bushing 77 stabilizes the connectors 13, 15 and prevents breakage of the ceramic sleeve 211 supporting the optical interface between the termini 71, 73. Conventional connectors of this type do not include a guide bushing. As a result, the guide pin of one connector is directly received in the guide hole of the other connector. Because the guide hole is formed from a plastic mold it is difficult to obtain a close tolerance on the size of the hole. The size of the plastic hole can vary up 3 or 4 thousandths of an inch during manufacture. This relatively large variance cannot consistently locate the guide pin to a high enough precision to properly interface the fiber optic termini. Therefore, the termini may engage at a skewed angle causing the terminus associated with the male adapter to engage the ceramic sleeve in the female adapter. This engagement can break the ceramic sleeve permanently damaging the connector's ability to optically interface the termini. The present construction prevents the breakage of the ceramic sleeve by adding the bushing to consistently and precisely locate the guide pin (FIG. 23A). A metal bushing allows the size, and in particular the size of the internal diameter of the bushing, to be constructed to a high tolerance (±0.0005 in.). Thus, in manufacture the clearance 95 between the guide pin 75 and the guide bushing 77 is consistently kept small enough to prevent the termini from engaging and breaking the ceramic sleeve 211. The dust seal 175 on the female adapter 61 seals against the inner surface of the male adapter 51 to protect the ferrules 103 of the termini 71, 73 from contaminants. Fasteners 93 can be inserted into the fastener holes 89 to fix the connectors 13, 15 together.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A connector comprising:
an insulating connector body, having a plurality of contact holes formed in the connector body; and
a metal shell receiving the connector body;
a plurality of fiber optic termini;
a plurality of adapters, each adapter being received in a respective one of the contact holes and supporting a respective one of the fiber optic termini;
a plurality of securing members located on an exterior surface of the connector body, each securing member being independently removable from the connector body and releasably attaching one of the plurality of adapters to the connector body such that each adapter and the terminus supported thereby can be conjointly and nondestructively inserted into the connector body and conjointly and nondestructively removed from the connector body independently of the others of the plurality of adapters and fiber optic termini when the respective one of the securing members is removed from the connector body.

2. The connector set forth in claim 1 wherein each securing member is adapted for nondestructive removal from the respective adapter to permit the adapter to be nondestructively removed from the respective contact hole of the connector body.

3. The connector set forth in claim 2 wherein each securing member comprises a c-clip removably received on the respective adapter to hold the adapter in the respective contact hole of the connector body.

4. The connector set forth in claim 3 wherein each adapter includes a first shoulder engaging the respective c-clip.

5. The connector set forth in claim 4 wherein each adapter includes a second shoulder engaging the connector body inside the respective contact hole cooperating with the respective c-clip and first shoulder to hold the adapter in the contact hole.

6. The connector set forth in claim 1 wherein at least one of the adapters is a female adapter configured for mating with a corresponding male adapter associated with another connector, the female adapter including a dust seal for sealing against the male adapter when the connector is mated with said another connector to protect an interface end of the fiber optic terminus from contaminants.

7. The connector set forth in claim 6 wherein the female adapter has a nose portion configured for insertion into the male adapter, the seal being disposed around the nose portion and retained thereon by a friction fit.

8. The connector set forth in claim 1 in combination with another, mating connector.

9. A connector comprising:
an insulating connector body, having a contact hole formed in the connector body; and
a metal shell receiving the connector body;
a fiber optic terminus;
an adapter in the contact hole and supporting the fiber optic terminus;
a securing member located on an exterior surface of the connector body releasably attaching the adapter to the connector body such that the adapter and terminus can be conjointly and nondestructively inserted into the connector body by moving the adapter relative to the connector body along an axis in an insertion direction and conjointly and nondestructively removed from the connector body by moving the adapter relative to the connector body along the axis in a removal direction opposite the insertion direction, the securing member engaging the adapter when the securing member attaches the adapter to the connector body to prevent the adapter from moving relative to the connector body in the insertion and removal directions.

10. The connector set forth in claim 9 wherein the securing member comprises a c-clip removably received on the adapter to hold the adapter in the contact hole of the connector body.

11. The connector set forth in claim 10 wherein the adapter includes a first shoulder engaging the respective c-clip.

12. The connector set forth in claim 11 wherein the adapter includes a second shoulder engaging the connector body inside the contact hole cooperating with the respective c-clip and first shoulder to hold the adapter in the contact hole.

13. A connector comprising:
an insulating connector body, having a contact hole formed in the connector body; and
a metal shell receiving the connector body;
a fiber optic terminus;
an adapter in the contact hole and supporting the fiber optic terminus;

a securing member located on an exterior surface of the connector body releasably attaching the adapter to the connector body such that the adapter and terminus can be conjointly and nondestructively inserted into the connector body and conjointly and nondestructively removed from the connector body;

wherein the adapter is a female adapter configured for mating with a corresponding male adapter associated with another connector, the female adapter including a dust seal for sealing against the male adapter when the connector is mated with said another connector to protect an interface end of the fiber optic terminus from contaminants.

14. The connector set forth in claim 13 wherein the female adapter has a nose portion configured for insertion into the male adapter, the seal being disposed around the nose portion and retained thereon by a friction fit.

* * * * *